US010940529B2

(12) United States Patent
Marcin

(10) Patent No.: US 10,940,529 B2
(45) Date of Patent: *Mar. 9, 2021

(54) METHOD TO PRODUCE JET ENGINE COMBUSTOR HEAT SHIELD PANELS ASSEMBLY

(71) Applicant: United Technologies Corporation, Farmington, CT (US)

(72) Inventor: John Joseph Marcin, Marlborough, CT (US)

(73) Assignee: RAYTHEON TECHNOLOGIES CORPORATION, Waltham, MA (US)

(*) Notice: Subject to any disclaimer, the term of this patent is extended or adjusted under 35 U.S.C. 154(b) by 445 days.

This patent is subject to a terminal disclaimer.

(21) Appl. No.: 15/702,132

(22) Filed: Sep. 12, 2017

(65) Prior Publication Data

US 2019/0076915 A1    Mar. 14, 2019

(51) Int. Cl.
*B22C 9/04* (2006.01)
*B22C 7/02* (2006.01)
(Continued)

(52) U.S. Cl.
CPC .......... *B22C 9/04* (2013.01); *C04B 35/62222* (2013.01); *F23M 5/04* (2013.01);
(Continued)

(58) Field of Classification Search
CPC .. B22C 7/02; B22C 9/04; B22C 9/043; B22D 15/00; B22D 27/04; B22D 27/045;
(Continued)

(56) References Cited

U.S. PATENT DOCUMENTS 6,931,855 B2    8/2005  Glessner et al.
8,978,385 B2    3/2015  Cunha
(Continued)

FOREIGN PATENT DOCUMENTS

EP    0741268 A1    11/1996

OTHER PUBLICATIONS

Partial European Search Report for Application No. 18194029.7-1009; Report dated Oct. 26, 2018; 13 pages.
(Continued)

*Primary Examiner* — Kevin P Kerns
(74) *Attorney, Agent, or Firm* — Cantor Colburn LLP

(57) ABSTRACT

A method of manufacturing a heat shield panel assembly is provided. The method including: injecting melted wax into a negative cavity of a heat shield panel, the heat shield panel including one or more orifices; allowing the wax to solidify to form a positive pattern of the heat shield panel; removing the positive pattern from the negative cavity; coating the positive pattern with a ceramic; melting the positive pattern away from the ceramic, the ceramic having a cavity forming a second negative cavity of the heat shield panel; pouring melted metal into the cavity; allowing metal in the cavity to solidify to form the heat shield panel; removing the ceramic from the heat shield panel; and forming each of one or more threaded studs separately from the heat shield panel, each of the one or more threaded studs including a stud portion and a thread portion simultaneously formed.

18 Claims, 20 Drawing Sheets

(51) Int. Cl.
  *B22D 27/04* (2006.01)
  *B22D 29/00* (2006.01)
  *C04B 35/622* (2006.01)
  *F23R 3/00* (2006.01)
  *F23R 3/60* (2006.01)
  *F23M 5/04* (2006.01)

(52) U.S. Cl.
  CPC .............. *F23R 3/002* (2013.01); *F23R 3/007* (2013.01); *F23R 3/60* (2013.01); *F23R 2900/00017* (2013.01); *F23R 2900/00018* (2013.01)

(58) Field of Classification Search
  CPC .. B22D 29/00; B22D 30/00; C04B 35/62222; F23M 5/04; F23R 3/002; F23R 3/007; F23R 3/60; F23R 2900/00017; F23R 2900/00018
  USPC .... 164/34, 35, 45, 23, 516, 122, 122.1, 125, 164/131
  See application file for complete search history.

(56) References Cited

U.S. PATENT DOCUMENTS

| | | |
|---|---|---|
| 9,511,418 B2 | 12/2016 | Duelm |
| 9,517,507 B2 | 12/2016 | Campomanes et al. |
| 2002/0124572 A1 | 9/2002 | Pidcock et al. |
| 2010/0263386 A1 | 10/2010 | Edwards et al. |
| 2014/0090383 A1 | 4/2014 | Duelm |
| 2016/0033129 A1 | 2/2016 | Burd |
| 2017/0176005 A1 | 6/2017 | Rimmer et al. |
| 2019/0076916 A1* | 3/2019 | Marcin ................... F23R 3/60 |

OTHER PUBLICATIONS

European Office Action dated May 29, 2020; Application No. 18194029.7; 4 pages.

* cited by examiner

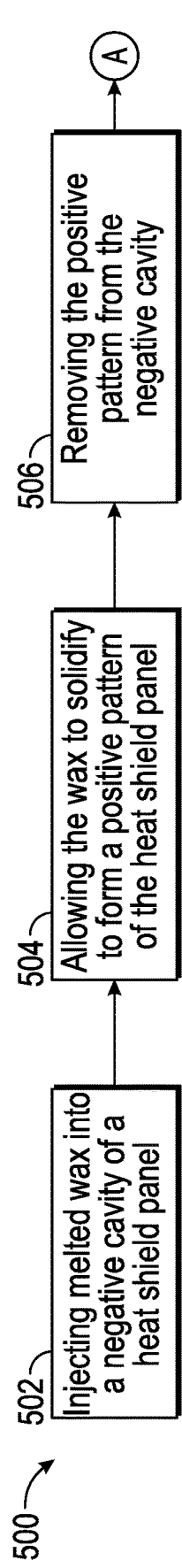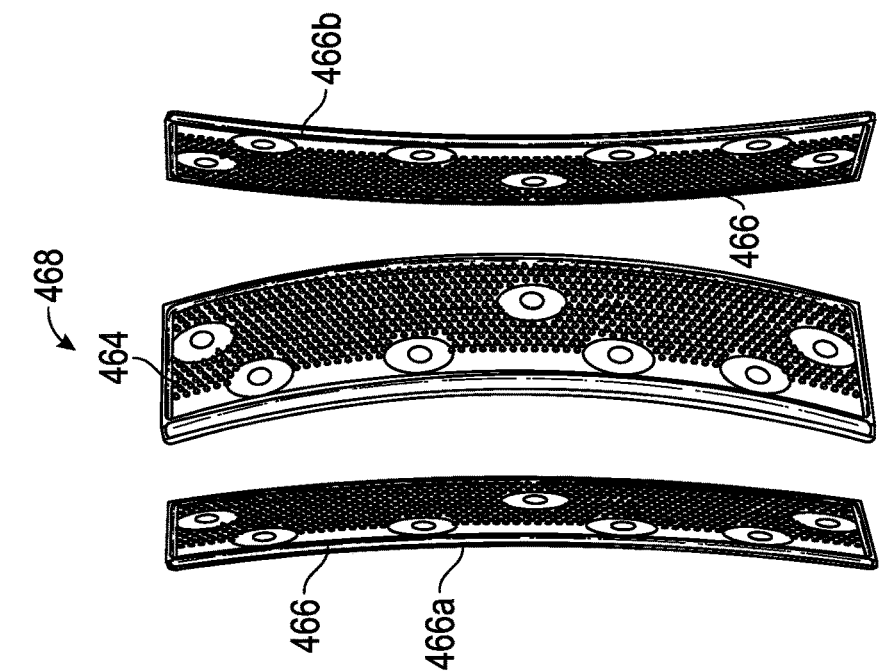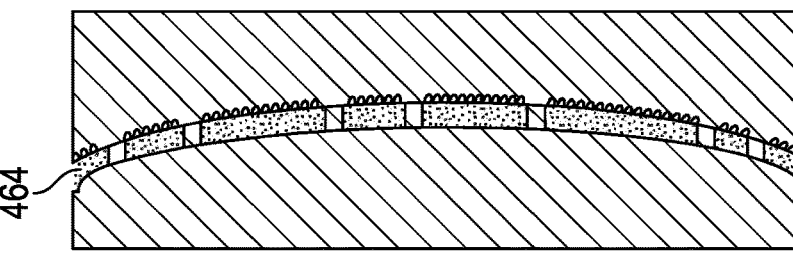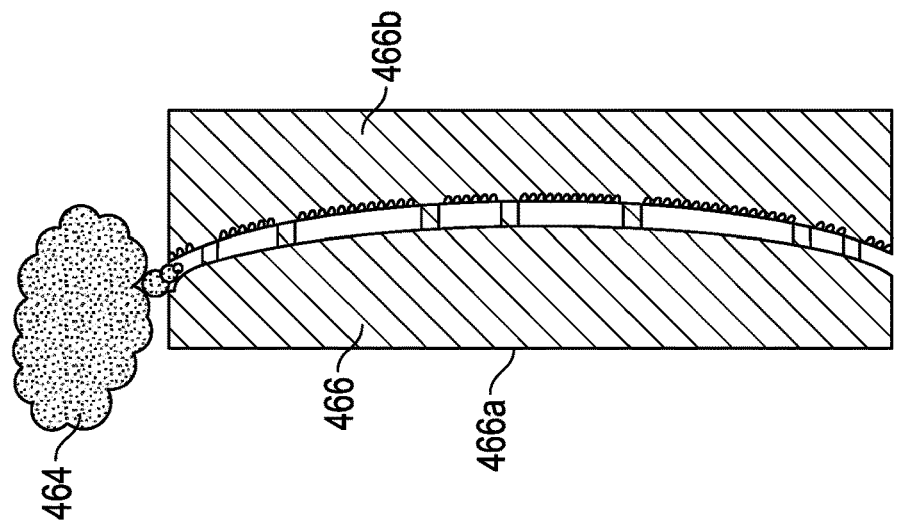
FIG. 5A
FIG. 5B
FIG. 5C

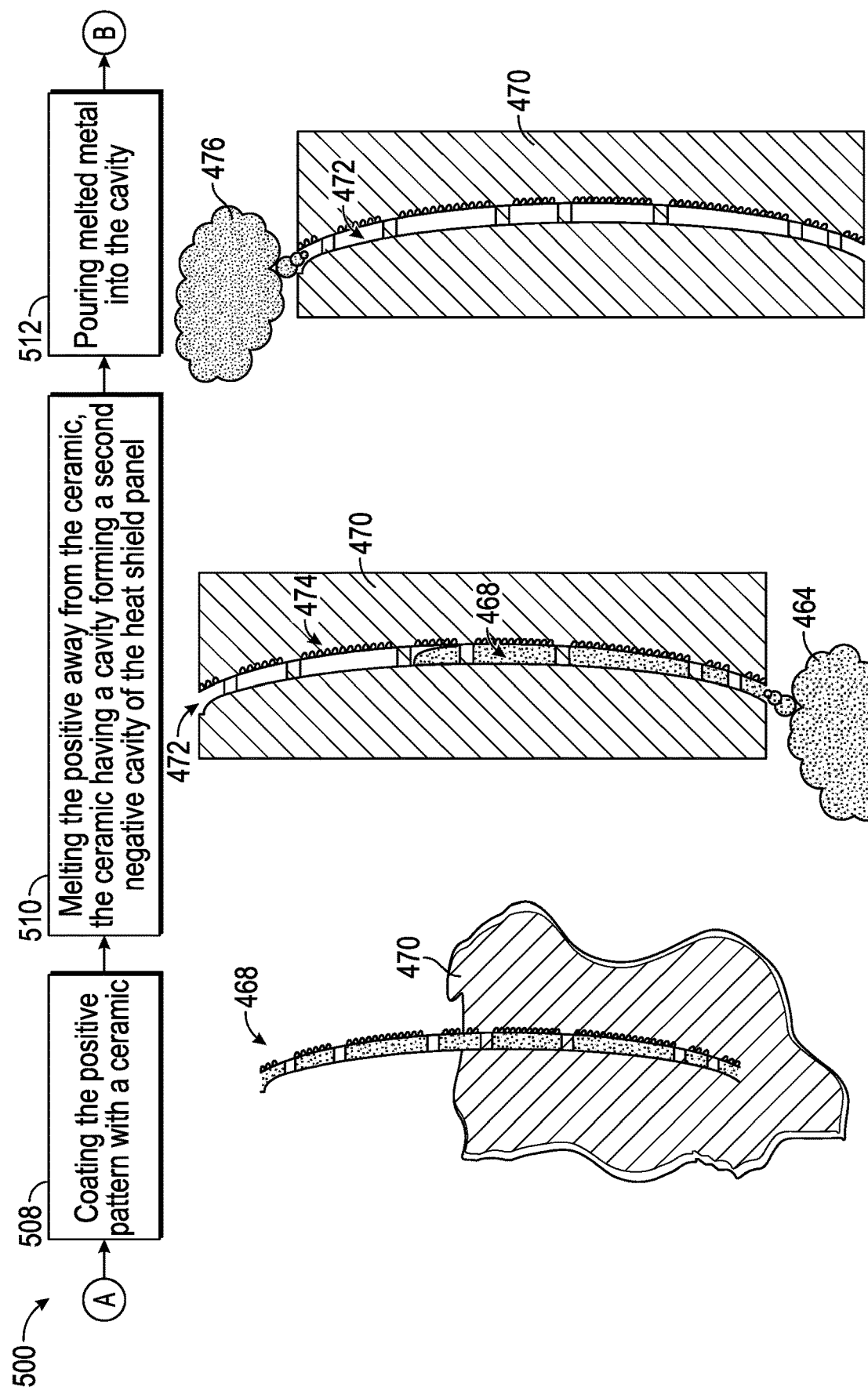

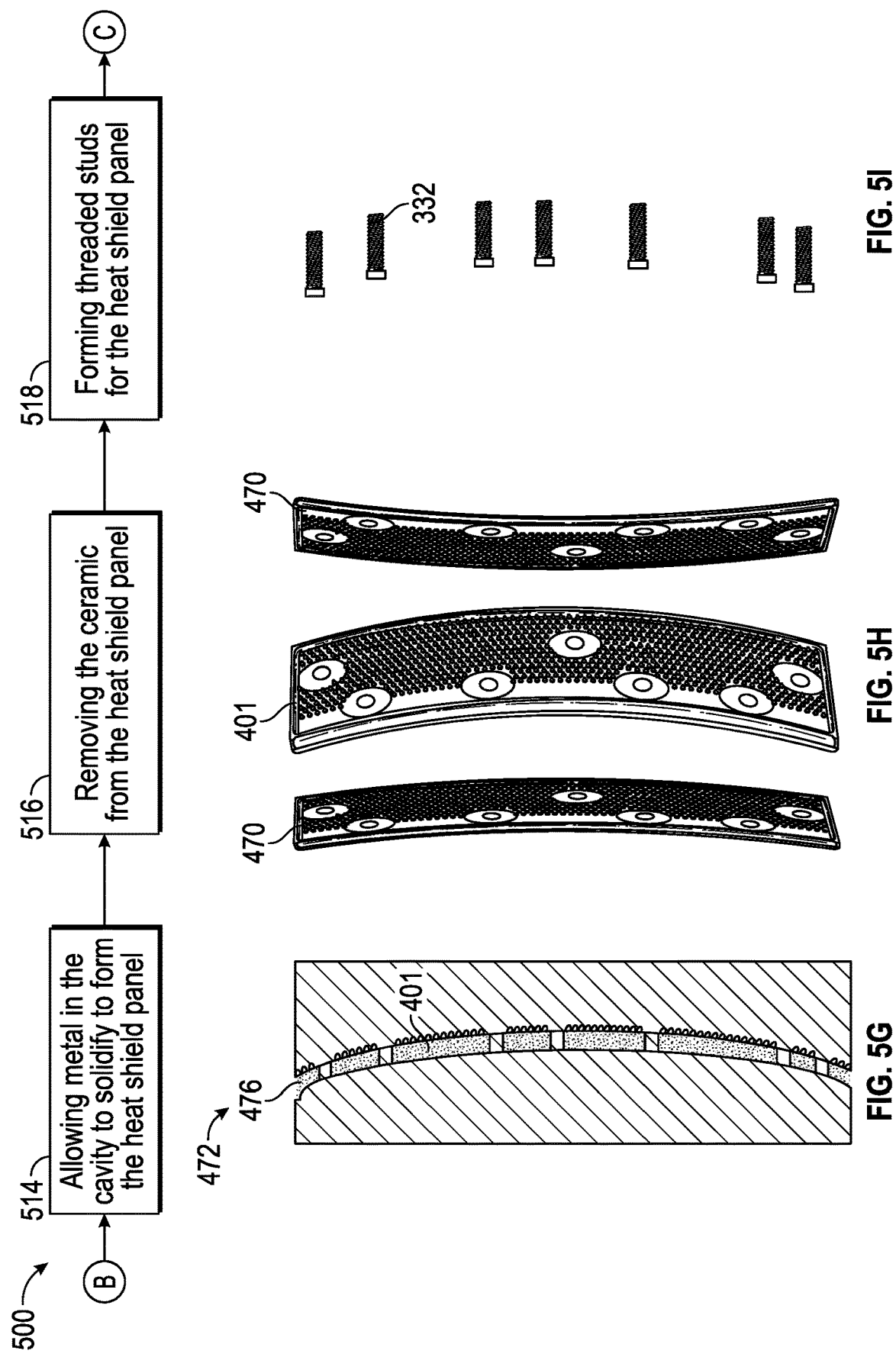

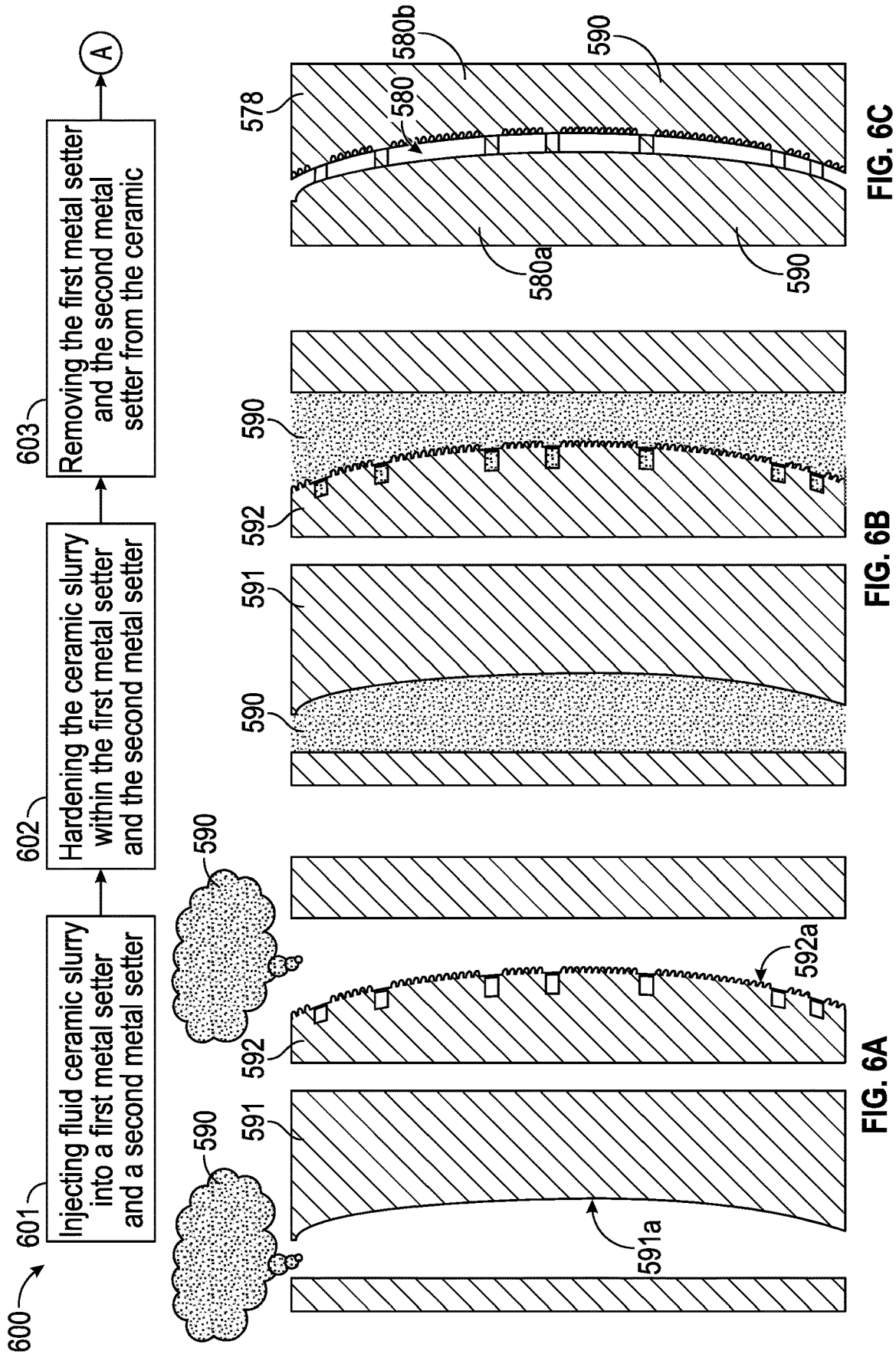

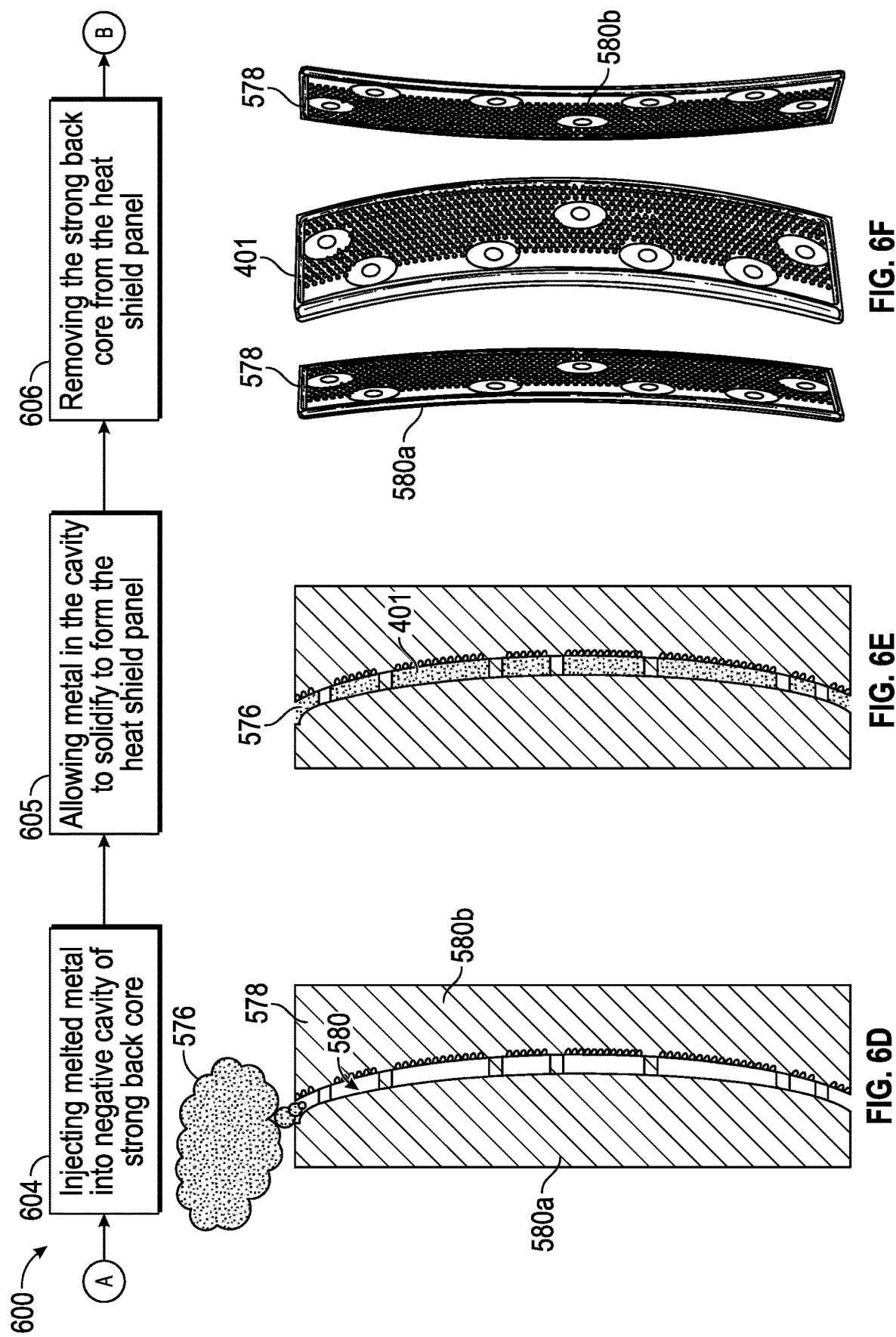

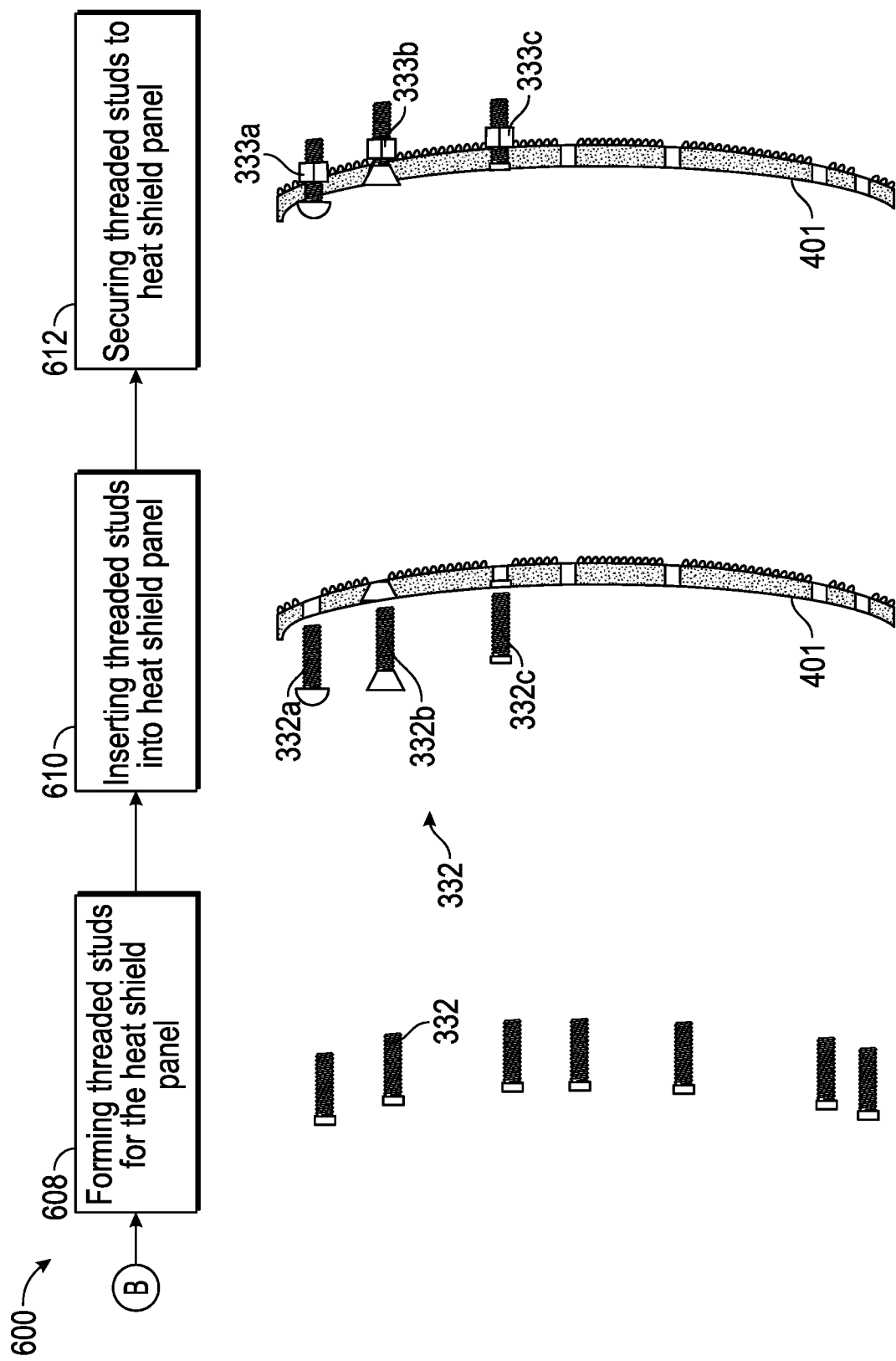

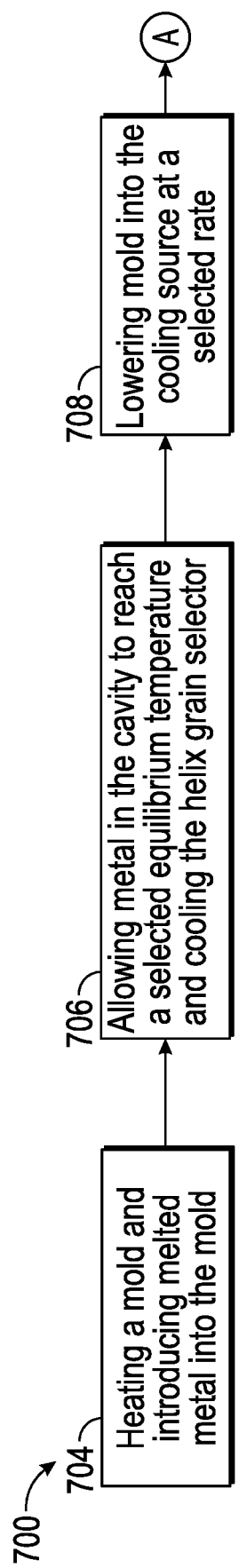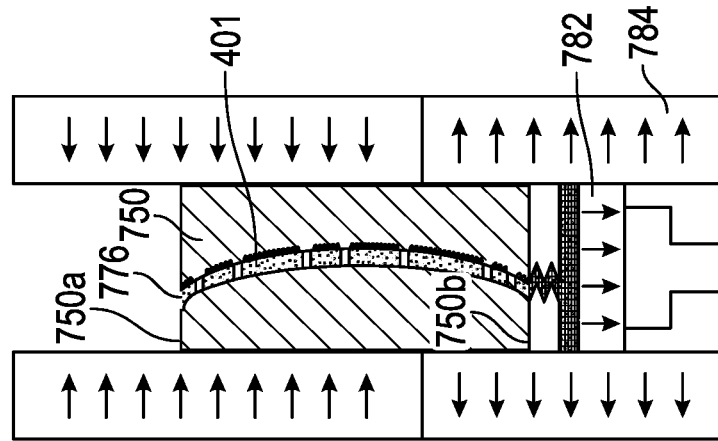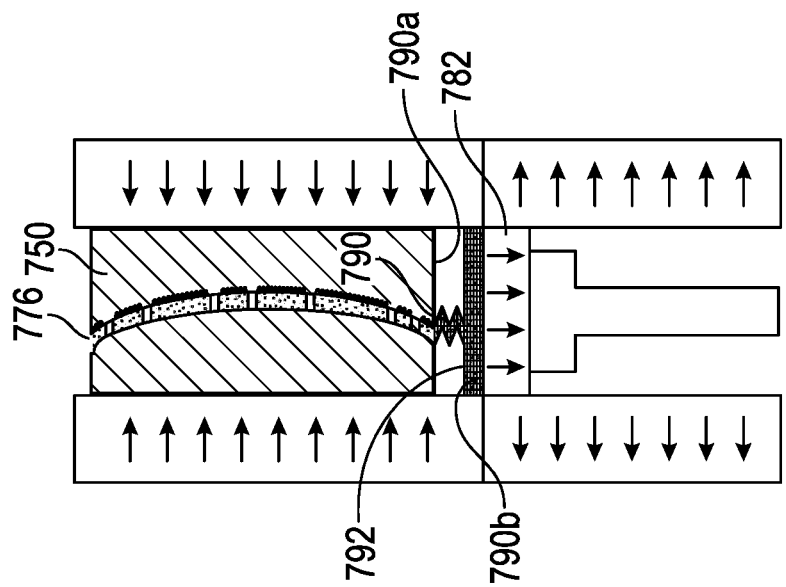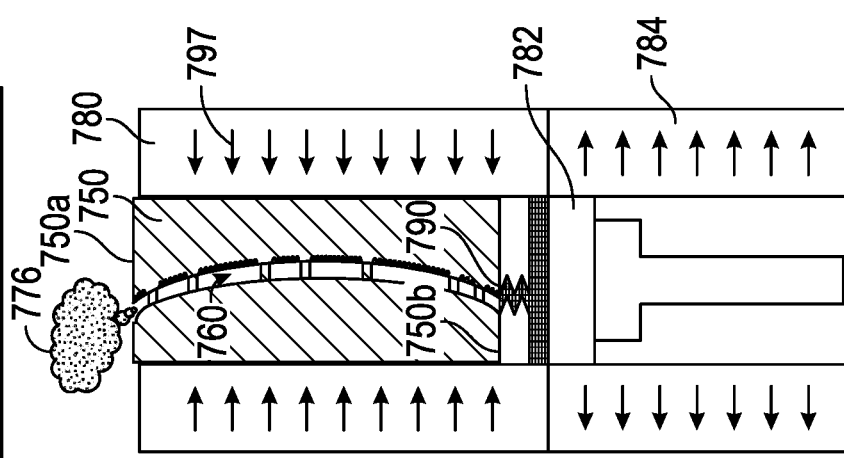
FIG. 7A  FIG. 7B  FIG. 7C

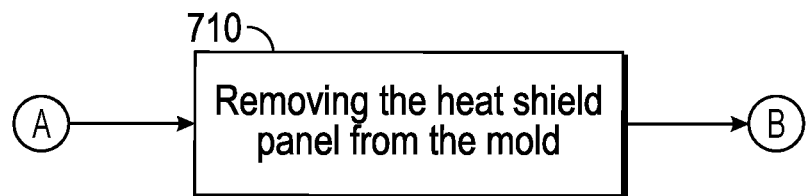
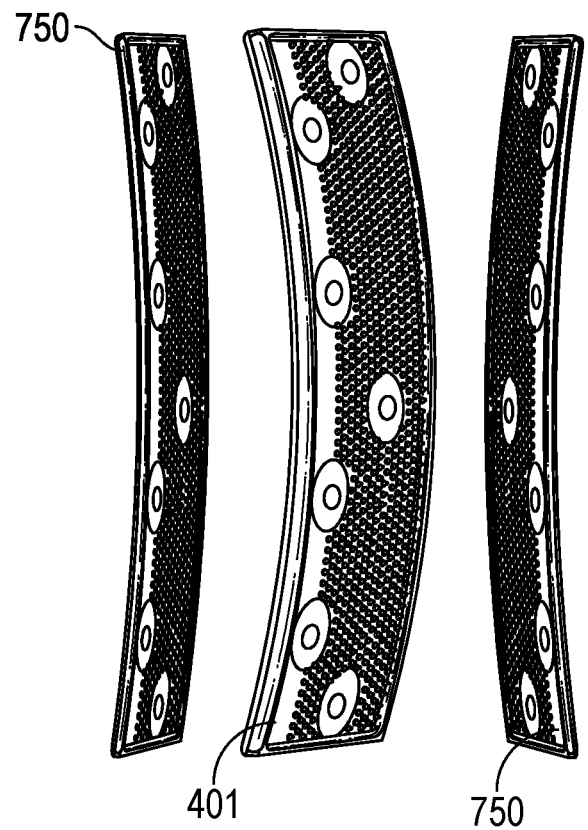
FIG. 7D

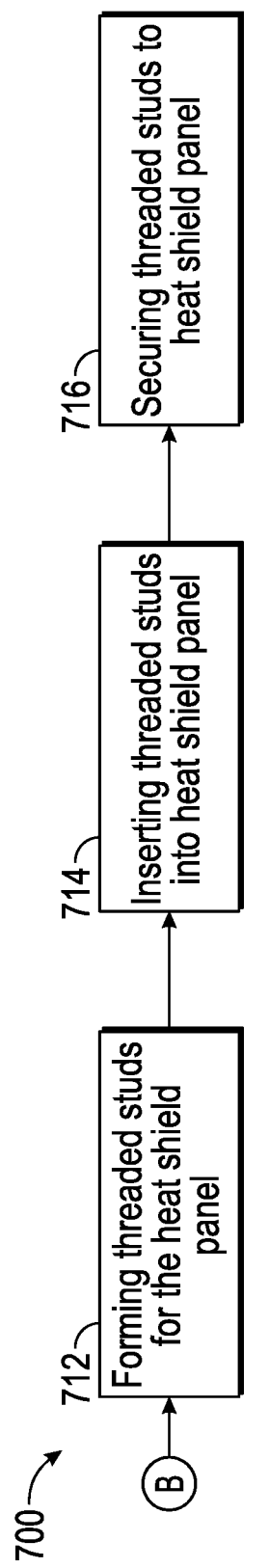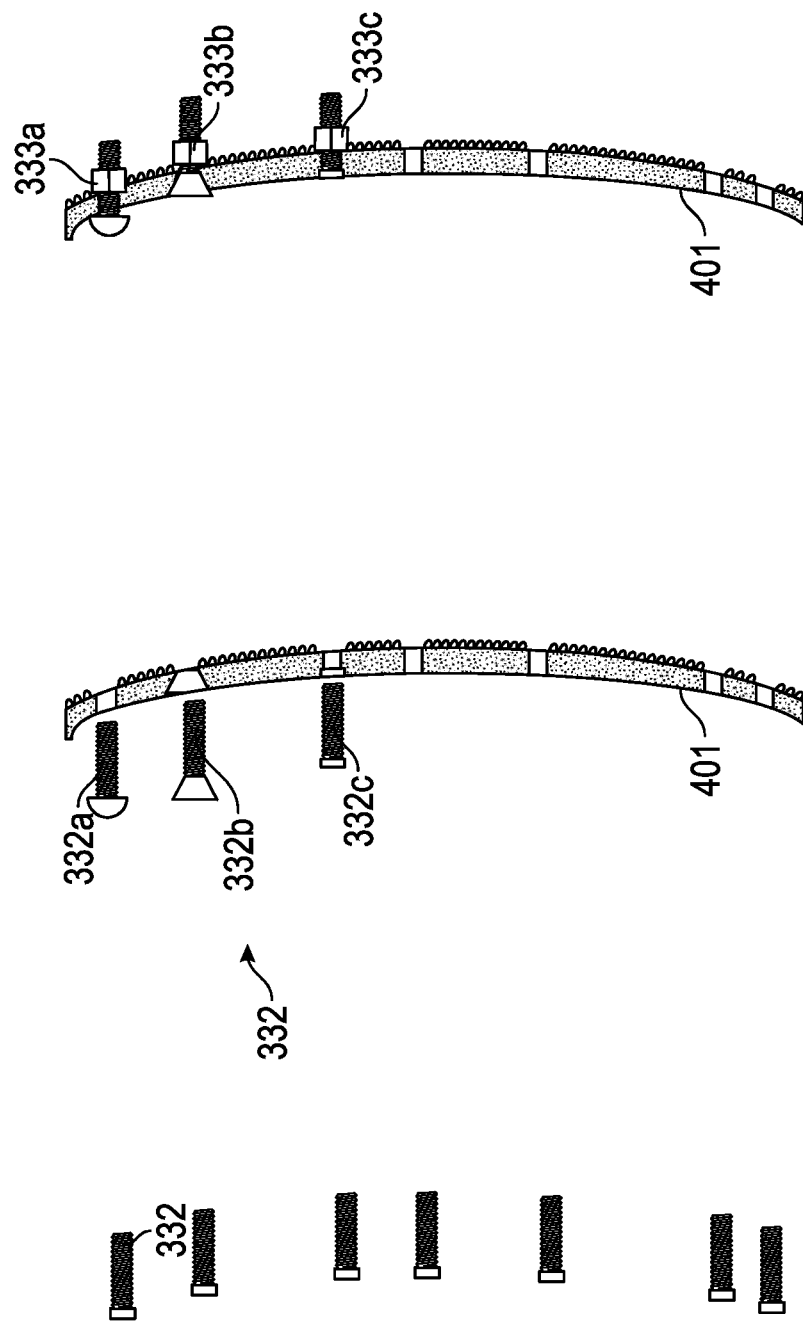
FIG. 7E   FIG. 7F   FIG. 7G

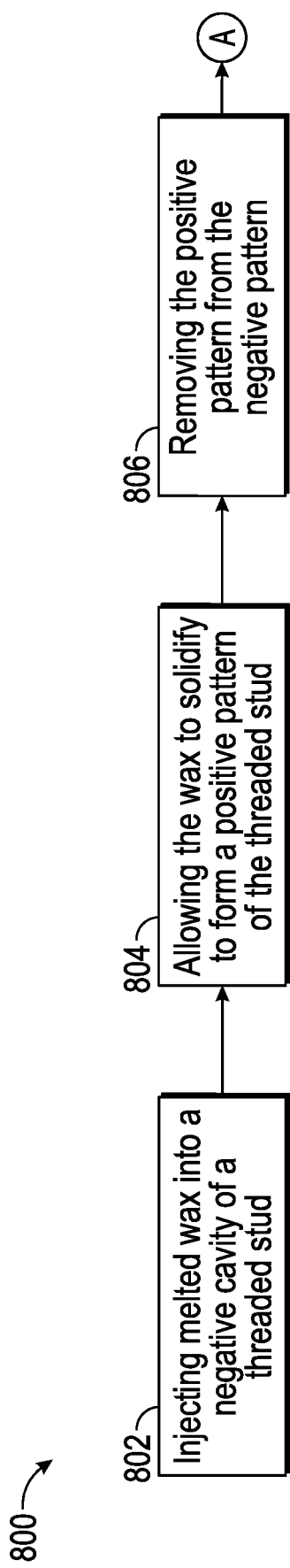
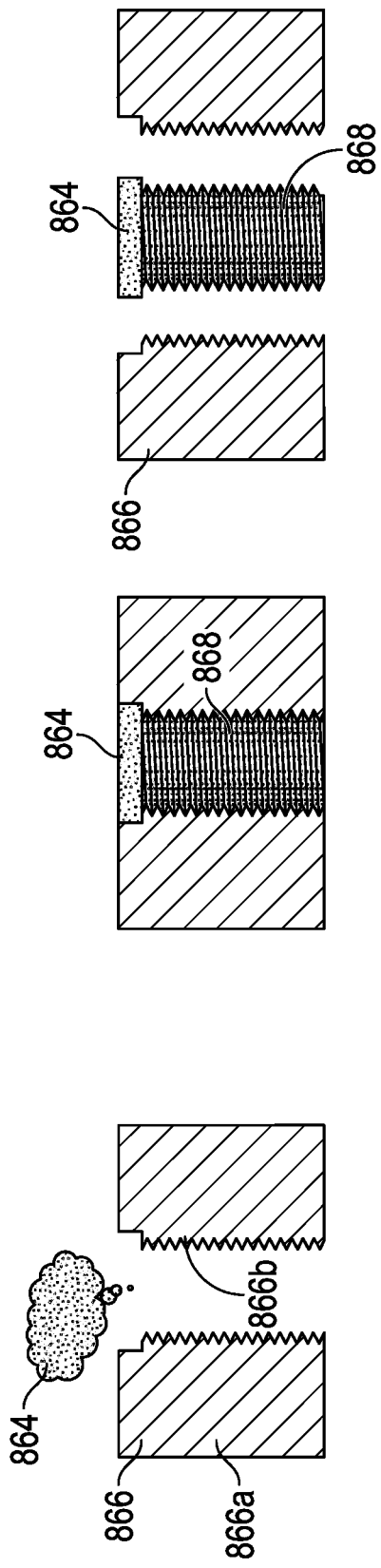
FIG. 8A
FIG. 8B
FIG. 8C

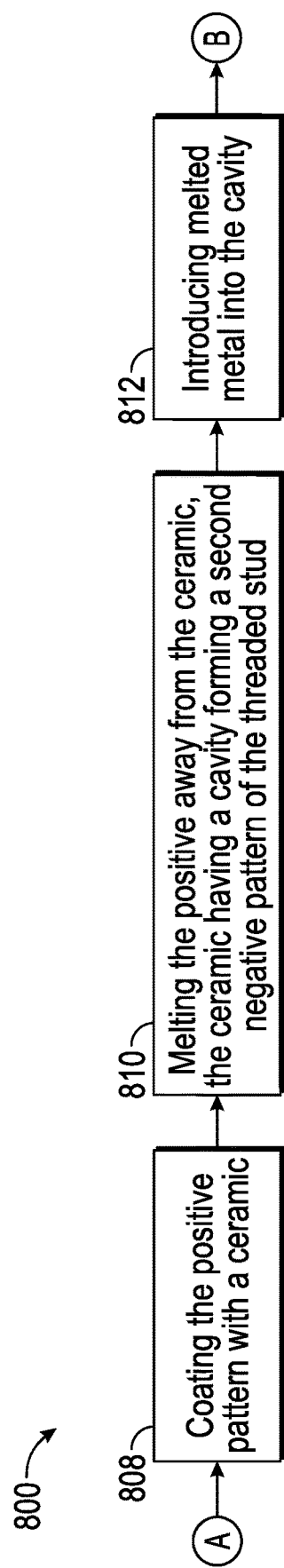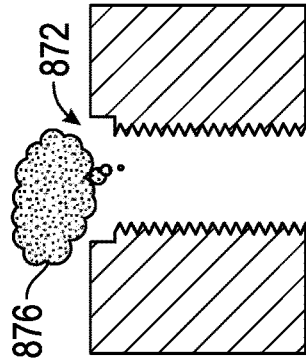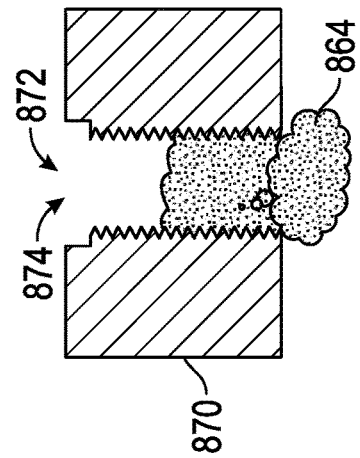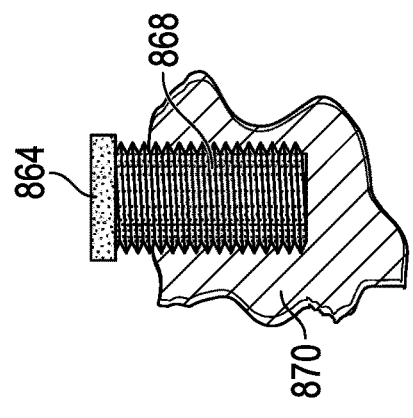
FIG. 8F
FIG. 8E
FIG. 8D

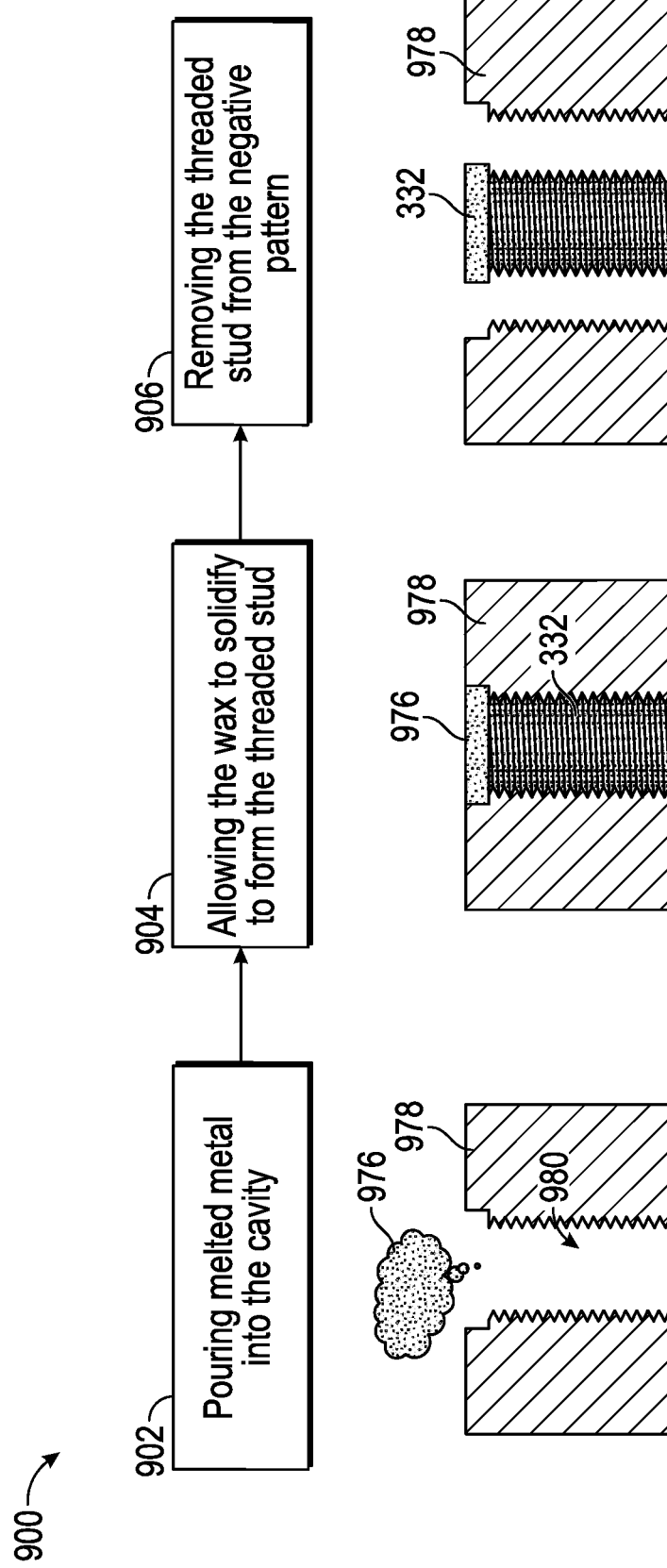

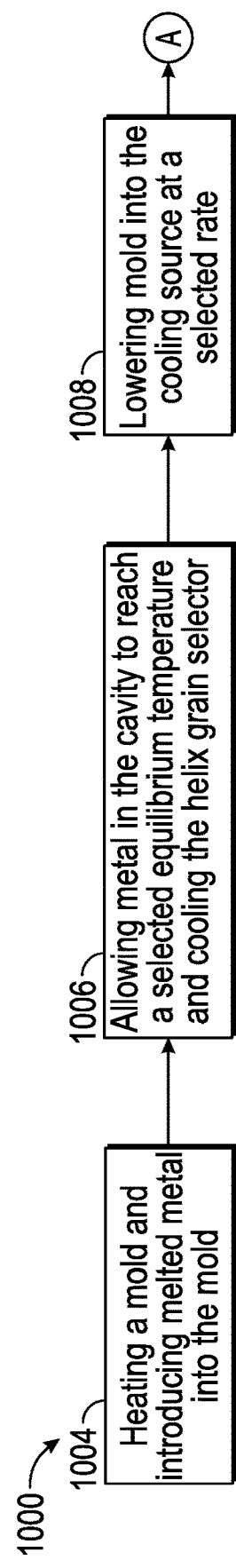
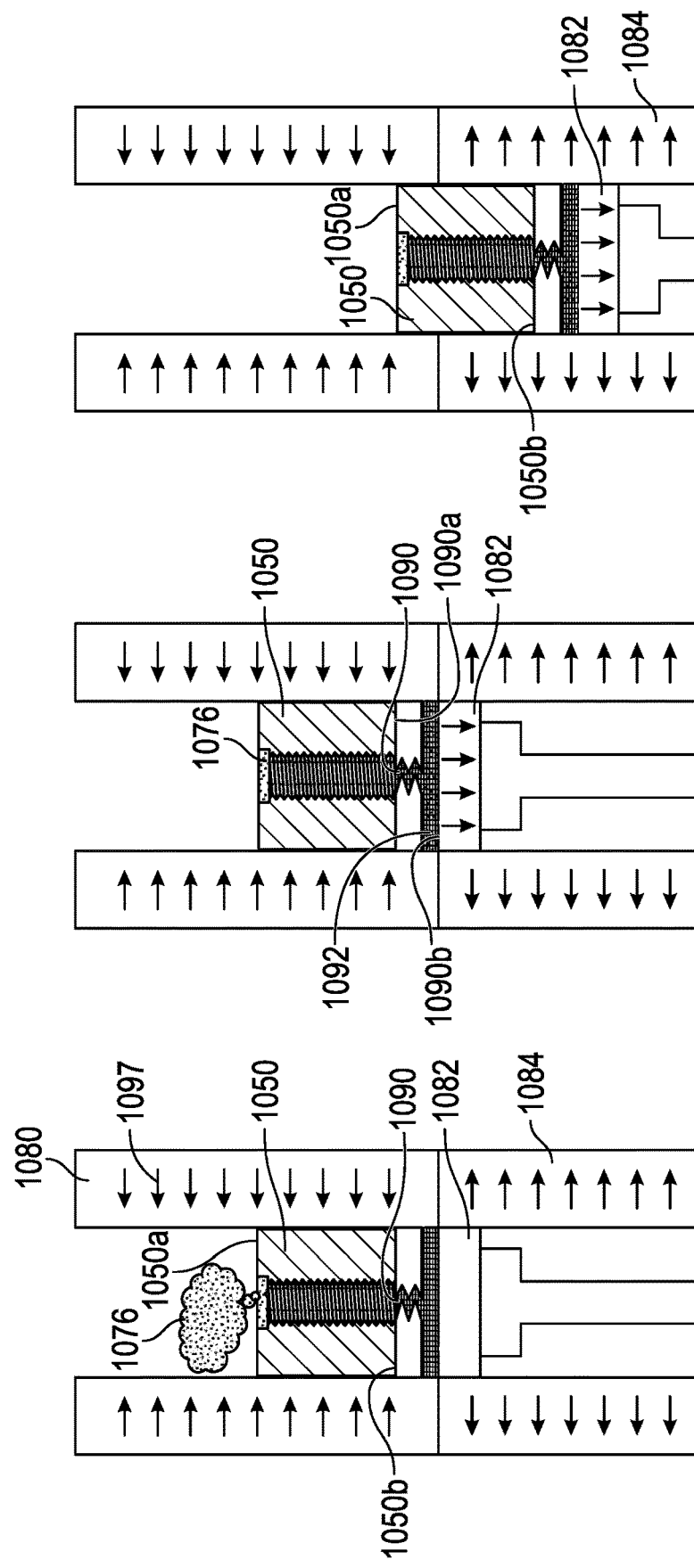
FIG. 10A  FIG. 10B  FIG. 10C

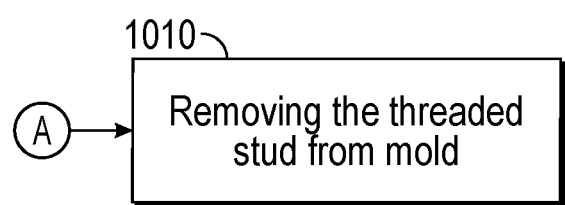
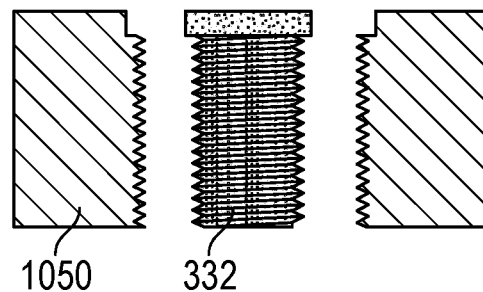
FIG. 10D

METHOD TO PRODUCE JET ENGINE COMBUSTOR HEAT SHIELD PANELS ASSEMBLY

BACKGROUND

The subject matter disclosed herein generally relates to combustors in gas turbine engines and, more particularly, to heat shield panels in combustors of gas turbine engines.

A combustor of a gas turbine engine may be configured and required to burn fuel in a minimum volume. Such configurations may place substantial heat load on the structure of the combustor (e.g., panels, shell, etc.). Such heat loads may dictate that special consideration is given to structures which may be configured as heat shields or panels configured to protect the walls of the combustor. Even with such configurations, excess temperatures at various locations may occur leading to oxidation, cracking, and high thermal stresses of the heat shields or panels. Manufacturing of heat shield panels is a difficult process and improvements to the manufacturing process are greatly desired.

SUMMARY

According to one embodiment, a method of manufacturing a heat shield panel assembly is provided. The method comprising: injecting melted wax into a negative cavity of a heat shield panel, the heat shield panel comprising one or more orifices; allowing the wax to solidify to form a positive pattern of the heat shield panel; removing the positive pattern from the negative cavity; coating the positive pattern with a ceramic; melting the positive pattern away from the ceramic, the ceramic having a cavity forming a second negative cavity of the heat shield panel; pouring melted metal into the cavity; allowing metal in the cavity to solidify to form the heat shield panel; and removing the ceramic from the heat shield panel.

In addition to one or more of the features described above, or as an alternative, further embodiments may include: forming each of one or more threaded heat shields or panels configured to protect the walls of the combustor. Even with such configurations, excess temperatures at various locations may occur leading to oxidation, cracking, and high thermal stresses of the heat shields or panels. Manufacturing of heat shield panels is a difficult process and improvements to the manufacturing process are greatly desired.

SUMMARY

According to one embodiment, a method of manufacturing a heat shield panel assembly is provided. The method comprising: injecting melted wax into a negative cavity of a heat shield panel, the heat shield panel comprising one or more orifices; allowing the wax to solidify to form a positive pattern of the heat shield panel; removing the positive pattern from the negative cavity; coating the positive pattern with a ceramic; melting the positive pattern away from the ceramic, the ceramic having a cavity forming a second negative cavity of the heat shield panel; pouring melted metal into the cavity; allowing metal in the cavity to solidify to form the heat shield panel; and removing the ceramic from the heat shield panel.

In addition to one or more of the features described above, or as an alternative, further embodiments may include: forming each of one or more threaded studs; and inserting each of the one or more threaded studs into each of the one or more orifices.

In addition to one or more of the features described above, or as an alternative, further embodiments may include: securing each of the one or more threaded studs to the heat shield panel.

In addition to one or more of the features described above, or as an alternative, further embodiments may include that the forming further comprises: injecting melted wax into a negative cavity of a threaded stud; allowing the wax to solidify to form a positive pattern of the threaded stud; removing the positive pattern of the threaded stud from the negative cavity of the threaded stud; coating the positive pattern of the threaded stud with a ceramic; melting the positive pattern of the threaded stud away from the ceramic, the ceramic having a second cavity forming a second negative cavity of the threaded stud; pouring melted metal into the second cavity; allowing metal in the second cavity to solidify to form the threaded stud; and removing the ceramic from the threaded stud.

In addition to one or more of the features described above, or as an alternative, further embodiments may include that the forming further comprises: injecting melted metal into a negative cavity of a threaded stud in a strong back core containing at least one of Y2O3, ZrO2, and ZrAl2O4, wherein the metal comprises yttrium; allowing the metal to solidify to form the threaded stud; and removing the threaded stud from the strong back core.

In addition to one or more of the features described above, or as an alternative, further embodiments may include that the forming further comprises: heating a mold containing a negative cavity of a threaded stud to a first temperature, wherein the negative cavity is fluidly connected to a helix grain selector located below the mold and on top of a cooling platform thermally connected to the helix grain selector; introducing melted metal into the negative cavity of the threaded stud and the helix grain selector; allowing metal in the negative cavity of the threaded stud and the helix grain selector to reach a selected equilibrium temperature; cooling metal within the helix grain selector using the cooling platform starting from the cooling platform and moving towards the mold; slowly lowering the mold into a cooling source to allow solidification of metal within the negative cavity of the threaded stud from a bottom of the mold to the top of the mold to form the threaded stud; and removing the threaded stud from the mold.

According to another embodiment a method of manufacturing a heat shield panel assembly is provided. The method comprising: injecting melted metal into a negative cavity of a heat shield panel in a strong back core containing at least one of Y2O3, ZrO2, and ZrAl2O4, wherein the metal comprises yttrium, and wherein the heat shield panel comprising one or more orifices; allowing the metal to solidify to form the heat shield panel; and removing the heat shield panel from the strong back core.

In addition to one or more of the features described above, or as an alternative, further embodiments may include: forming each of one or more threaded studs; and inserting each of the one or more threaded studs into each of the one or more orifices.

In addition to one or more of the features described above, or as an alternative, further embodiments may include: securing each of the one or more threaded studs to the heat shield panel.

In addition to one or more of the features described above, or as an alternative, further embodiments may include that the forming further comprises: injecting melted wax into a negative cavity of a threaded stud; allowing the wax to solidify to form a positive pattern of the threaded stud;

removing the positive pattern of the threaded stud from the negative cavity of the threaded stud; coating the positive pattern of the threaded stud with a ceramic; melting the positive pattern of the threaded stud away from the ceramic, the ceramic having a second cavity forming a second negative cavity of the threaded stud; pouring melted metal into the second cavity; allowing metal in the second cavity to solidify to form the threaded stud; and removing the ceramic from the threaded stud.

In addition to one or more of the features described above, or as an alternative, further embodiments may include that the forming further comprises: injecting melted metal into a negative cavity of a threaded stud in a second strong back core containing at least one of Y2O3, ZrO2, and ZrAl2O4, wherein the metal comprises yttrium; allowing the metal to solidify to form the threaded stud; and removing the threaded stud from the second strong back core.

In addition to one or more of the features described above, or as an alternative, further embodiments may include that the forming further comprises: heating a mold containing a negative cavity of a threaded stud to a first temperature, wherein the negative cavity is fluidly connected to a helix grain selector located below the mold and on top of a cooling platform thermally connected to the helix grain selector; introducing melted metal into the negative cavity of the threaded stud and the helix grain selector; allowing metal in the negative cavity of the threaded stud and the helix grain selector to reach a selected equilibrium temperature; cooling metal within the helix grain selector using the cooling platform starting from the cooling platform and moving towards the mold; slowly lowering the mold into a cooling source to allow solidification of metal within the negative cavity of the threaded stud from a bottom of the mold to the top of the mold to form the threaded stud; and removing the threaded stud from the mold.

According to another embodiment, a method of manufacturing a heat shield panel assembly is provided. The method comprising: heating a mold containing a negative cavity of a heat shield panel to a first temperature, wherein the negative cavity is fluidly connected to a helix grain selector located below the mold and on top of a cooling platform thermally connected to the helix grain selector, wherein the heat shield panel comprises one or more orifices; introducing melted metal into the negative cavity of the heat shield panel and the helix grain selector; allowing metal in the negative cavity of the heat shield panel and the helix grain selector to reach a selected equilibrium temperature; cooling metal within the helix grain selector using the cooling platform starting from the cooling platform and moving towards the mold; slowly lowering the mold into a cooling source to allow solidification of metal within the negative cavity of the heat shield panel from a bottom of the mold to the top of the mold to form the heat shield panel; and removing the heat shield panel from the mold.

In addition to one or more of the features described above, or as an alternative, further embodiments may include: forming each of one or more threaded studs; and inserting each of the one or more threaded studs into each of the one or more orifices.

In addition to one or more of the features described above, or as an alternative, further embodiments may include: securing each of the one or more threaded studs to the heat shield panel.

In addition to one or more of the features described above, or as an alternative, further embodiments may include that the forming further comprises: injecting melted wax into a negative cavity of a threaded stud; allowing the wax to solidify to form a positive pattern of the threaded stud; removing the positive pattern of the threaded stud from the negative cavity of the threaded stud; coating the positive pattern of the threaded stud with a ceramic; melting the positive pattern of the threaded stud away from the ceramic, the ceramic having a second cavity forming a second negative cavity of the threaded stud; pouring melted metal into the second cavity; allowing metal in the second cavity to solidify to form the threaded stud; and removing the ceramic from the threaded stud.

In addition to one or more of the features described above, or as an alternative, further embodiments may include that the forming further comprises: injecting melted metal into a negative cavity of a threaded stud in a strong back core containing at least one of Y2O3, ZrO2, and ZrAl2O4, wherein the metal comprises yttrium; allowing the metal to solidify to form the threaded stud; and removing the threaded stud from the strong back core.

In addition to one or more of the features described above, or as an alternative, further embodiments may include that the forming further comprises: heating a second mold containing a negative cavity of a threaded stud to a first temperature, wherein the negative cavity is fluidly connected to a second helix grain selector located below the second mold and on top of a cooling platform thermally connected to the second helix grain selector; introducing melted metal into the negative cavity of the threaded stud and the second helix grain selector; allowing metal in the negative cavity of the threaded stud and the second helix grain selector to reach a selected equilibrium temperature; cooling metal within the second helix grain selector using the cooling platform starting from the cooling platform and moving towards the second mold; slowly lowering the second mold into a cooling source to allow solidification of metal within the negative cavity of the threaded stud from a bottom of the second mold to the top of the second mold to form the threaded stud; and removing the threaded stud from the second mold.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 5a-5k is a flow chart illustrating a method of manufacturing a heat shield panel assembly, in accordance with an embodiment of the disclosure;

FIG. 6a-6i is a flow chart illustrating a method of manufacturing a heat shield panel assembly, in accordance with an embodiment of the disclosure;

FIG. 7a-7g is a flow chart illustrating a method of manufacturing a heat shield panel assembly, in accordance with an embodiment of the disclosure;

FIG. 8a-8h is a flow chart illustrating a method of manufacturing a threaded stud, in accordance with an embodiment of the disclosure;

FIG. 9a-9c is a flow chart illustrating a method of manufacturing a threaded stud, in accordance with an embodiment of the disclosure; and FIG. 10a-10d is a flow chart illustrating a method of manufacturing a threaded stud, in accordance with an embodiment of the disclosure.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines experience elevated heat levels during operation. Impingement and convective cooling of heat shield panels of the combustor wall may be used to help cool the combustor. Convective cooling may be achieved by air that is trapped between the heat shield panel and a liners of the combustor. Impingement cooling may be a process of directing relatively cool air from a location exterior to the combustor toward a back or underside of the heat shield panels. Thus, combustor liners and heat shields are utilized to face the hot products of combustion within a combustion chamber and protect the overall combustor liner. The combustor liners may be supplied with cooling air including dilution passages which deliver a high volume of cooling air into a hot flow path. The cooling air may be air from the compressor of the gas turbine engine. The cooling air may impinge upon a back side of a heat shield panel that faces a combustor liner inside the combustor.

The heat shield panels are typically attached to the combustor structure through threaded studs to protect the structure from environmental deterioration. These threads of the studs need to be positioned perpendicular to the contour of the heat shield panels so that they can attach to the curvature of the combustor liners. Once in place, the heat shield panels are attached to the combustor liners using retaining nuts. To cast the heat shield panels by investment casting, wax needs to be injected into a tool to create wax patterns that will be used to create a ceramic casting mold which will then be used to cast the metal heat shield panels. Having heat shield panels designs that have integral cast threads normal to the heat shield panel surface complicates the investment casting process since the threads cannot be injected directly with the heat shield panels since the angle of the posts and the threads will back lock in the die making it impossible to remove the wax pattern from the injection die. Thus, the threads need to be injected separately in wax and then wax welded to the wax pattern. Casting the heat shield panel and threads separately leads to casting difficulty and quality issues with thread alignment, thread integrity (free from defects like porosity or stray grains), and thread dimensional conformance. This leads to higher process and component cost. Embodiments disclosed herein seek to address the challenges of manufacturing a heat shield panel assembly.

Figure 1:
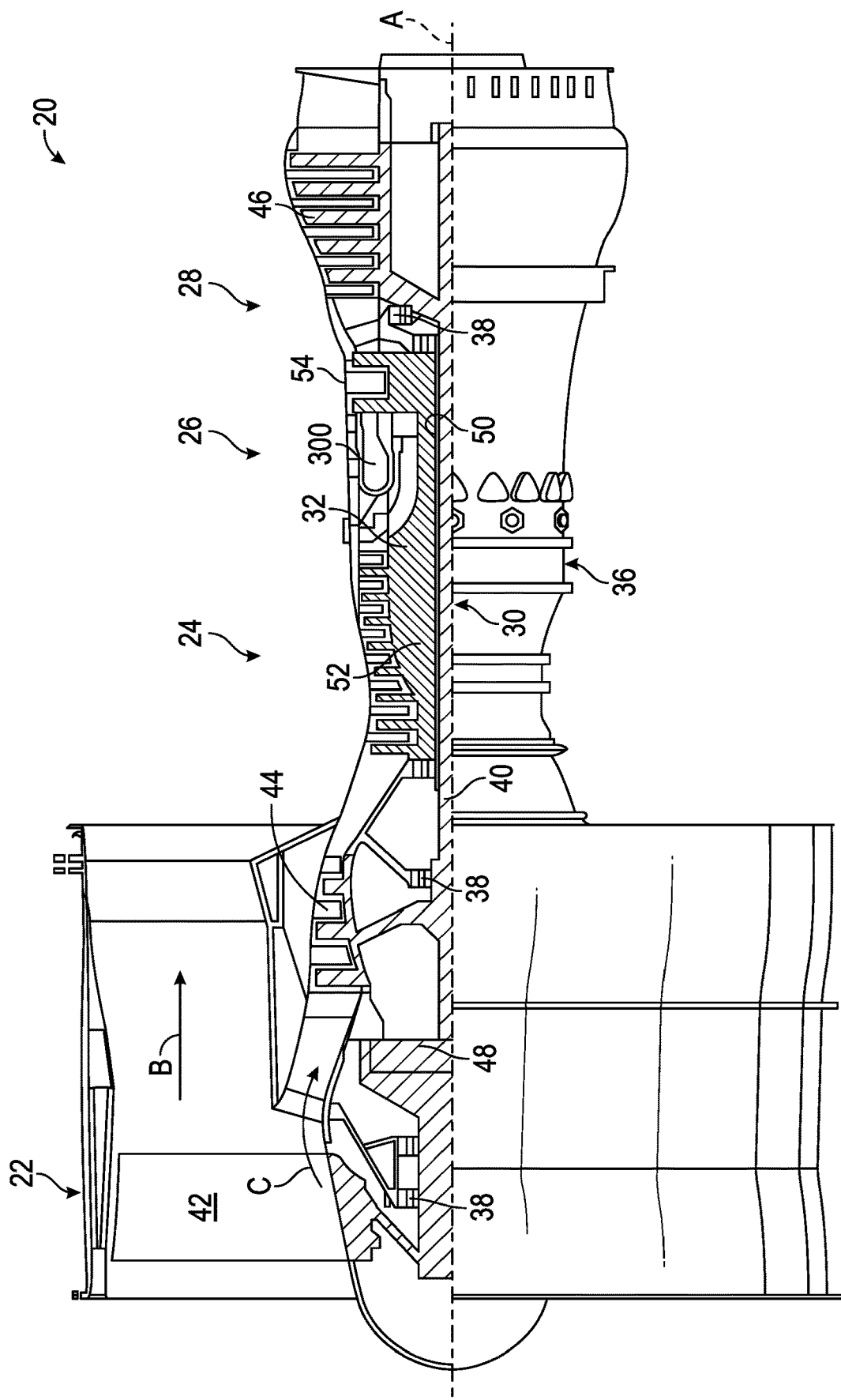
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
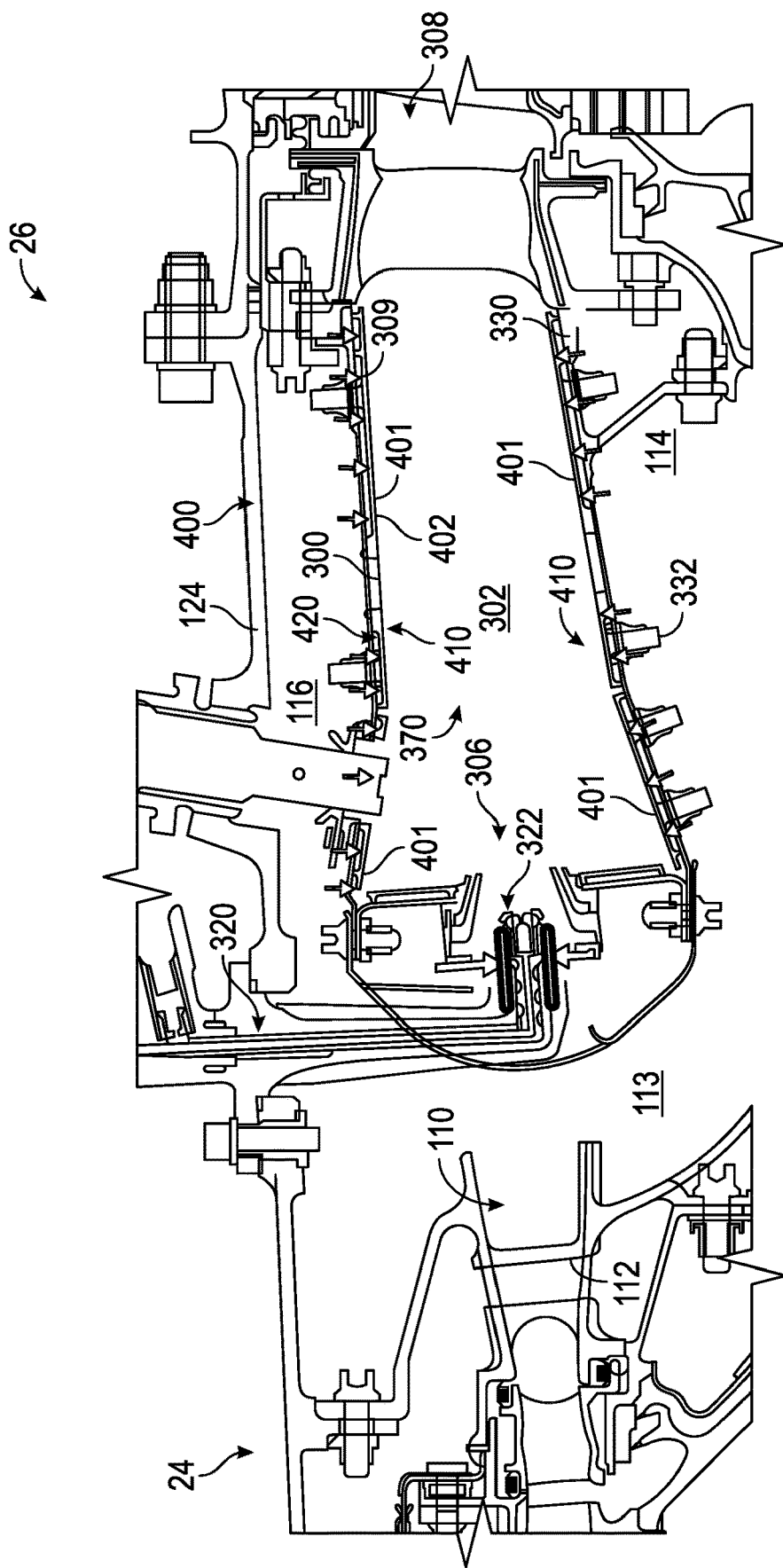
FIG. 2 is a cross-sectional illustration of a combustor, in accordance with an embodiment of the disclosure.

Referring now to FIG. 2 with continued reference to FIG. 1. FIG. 2 illustrates a combustor section 26 of a gas turbine engine 20. As shown, a combustor 300 defines a combustion chamber 302. The combustion chamber 302 includes a combustion zone 370, as shown in FIG. 2. The combustor 300 includes an inlet 306 and an outlet 308 through which air may pass. The air may be supplied to the combustor 300 by a pre-diffuser 110.

As shown in FIG. 2, compressor air is supplied from a compressor section 24 into an exit guide vane 112, as will be appreciated by those of skill in the art. The exit guide vane 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113, a portion of the air may flow into the combustor inlet 306, a portion may flow into the inner diameter branch 114, and a portion may flow into the outer diameter branch 116.

The air from the inner diameter branch 114 and the outer diameter branch 116 may then enter the combustion chamber 302 by means of one or more aperture 309, which may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion chamber 302. The combustor 300 of the engine combustion section 26 may be housed within a shroud case 124 which may define the shroud chamber 113.

The combustor 300, as shown in FIG. 2, includes multiple heat shield panel assemblies 400. The heat shield panel assembly 400 includes a heat shield panel 401 and one or more threaded studs 332. The heat shield panels 401 that are mounted on an interior surface of one or more combustion liner 330 and are arranged parallel to the combustion liner 330. The combustion liner 330 can define circular or annular structures with the heat shield panels 401 being mounted on a radially inward liner and a radially outward liner, as will be appreciated by those of skill in the art. The heat shield panels 401 can be removably mounted to the combustion liner 330 by one or more attachment mechanisms. In some embodiments, the attachment mechanism may be a threaded stud 332 or other structure that may extend from the respective heat shield panel 401 through the interior surface to a receiving portion or aperture of the combustion liner 330 such that the heat shield panel 401 may be attached to the combustion liner 330 and held in place. The heat shield panels 401 partially enclose a combustion zone 370 within the combustion chamber 302 of the combustor 300.

The heat shield panel 401 is composed of a panel body 402 having a first surface 410 and a second surface 420 opposite the first surface 410. The first surface 410 is configured to be oriented toward the combustion zone 370 of the combustor 300. The second surface 420 is configured to be oriented toward a combustor liner 330 of the combustor 300.

Figure 3:
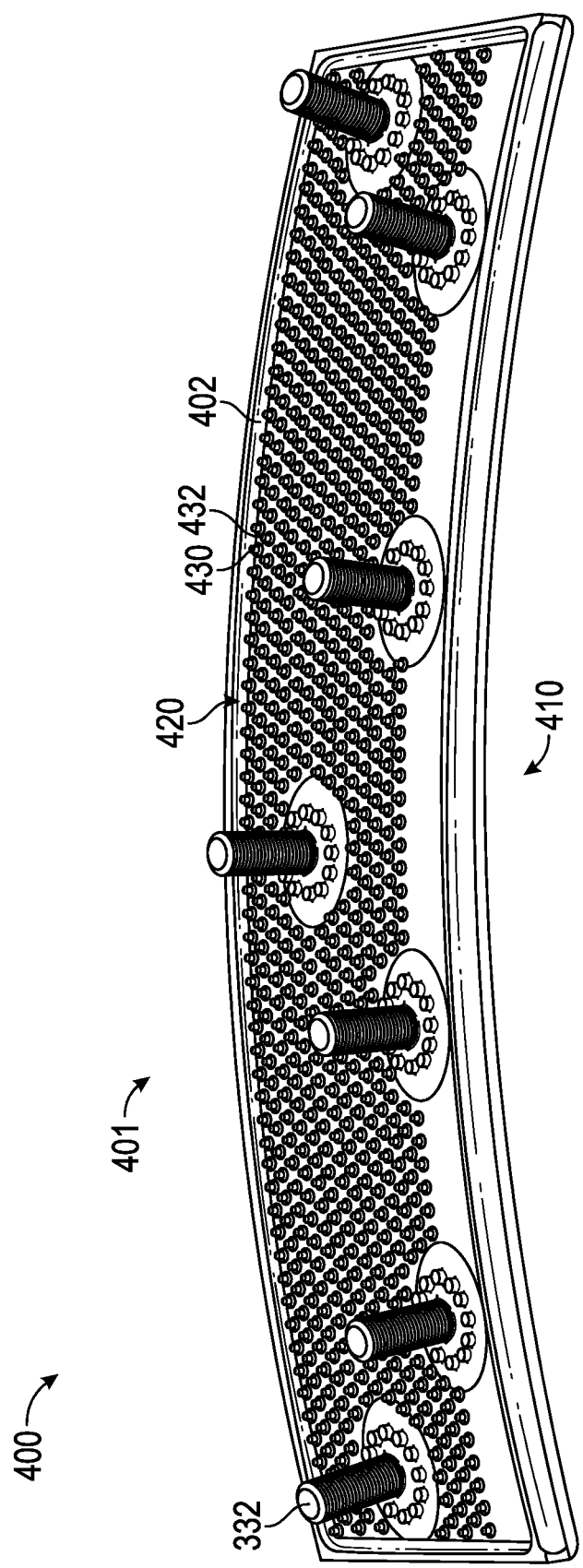
FIG. 3 is an illustration of a heat shield panel assembly, in accordance with an embodiment of the disclosure.
Figure 4:
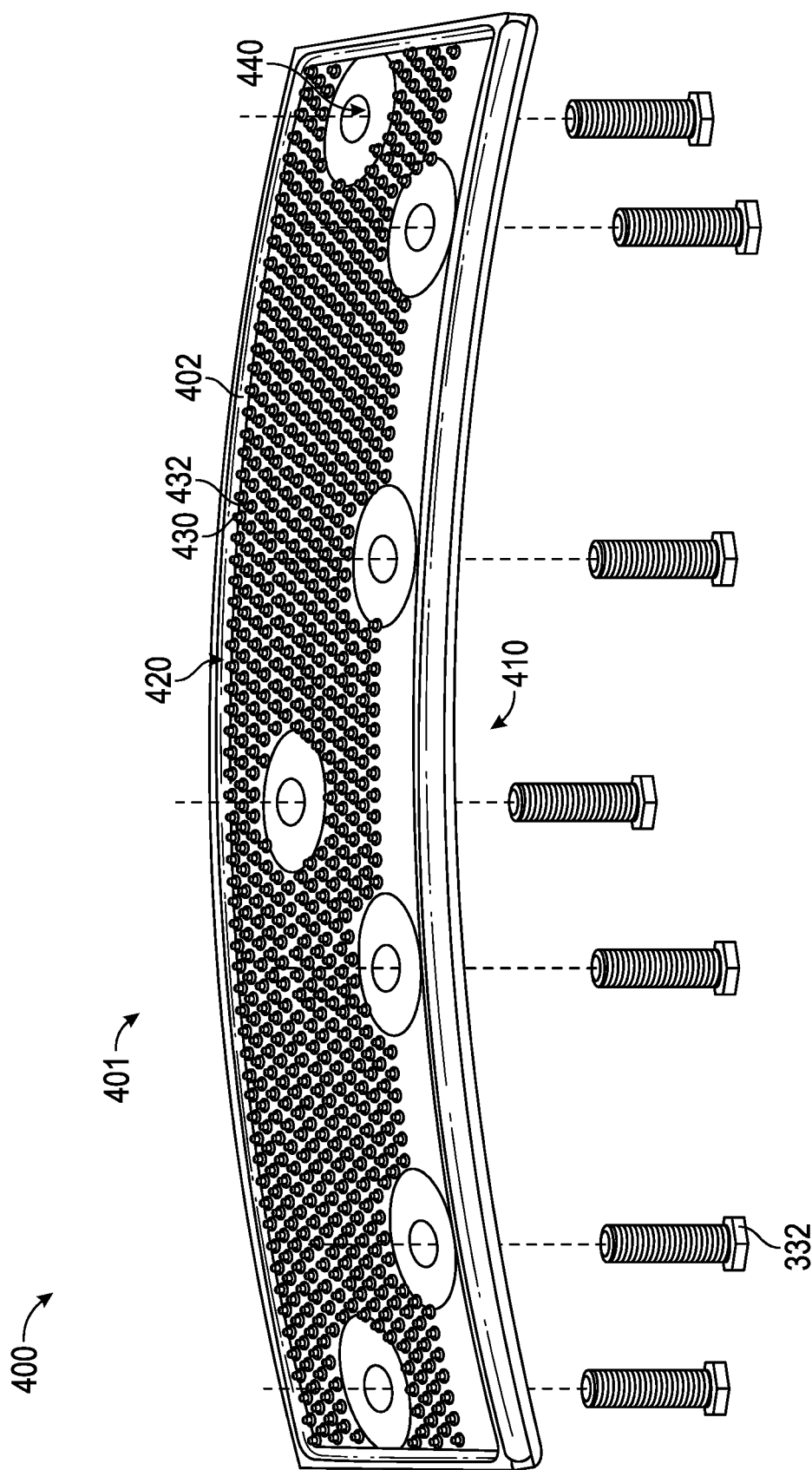
FIG. 4 is an illustration of a heat shield panel assembly, in accordance with an embodiment of the disclosure.

Referring now to FIG. 3-4 with continued reference to FIGS. 1 and 2. FIG. 3 illustrates an enlarged view of a heat shield panel assembly 400 of the combustor 300 of a gas turbine engine 20. The heat shield panel assembly 400 includes a heat shield panel 401 and one or more threaded studs 332. The heat shield panel 401 includes one or more orifices 440 where the threaded studs 332 may be inserted into and subsequently connected to the heat shield panel 401, as seen in FIG. 4. The thread studs 332 may be inserted into the panel 401 from either the first surface 410 or the second surface 420. As discussed above, the heat shield panel 401 is composed of a panel body 402 having a first surface 410 and a second surface 420 opposite the first surface 410. The heat shield panel 401 further includes a plurality of pin fins 430 projecting from the second surface 420 of the panel body 410. Each of the plurality of pin fins 430 has a rounded top 432 opposite the second surface 420. Each of the plurality of pin fins may be cylindrical in shape as seen in FIGS. 3-4. It is understood that each of the plurality of pin fins 430 may have shapes other than cylindrical. Advantageously, the pin fins 430 increase the surface area of the second surface 420 and subsequently increases the cooling ability of the second surface 420.

Figure 5J:
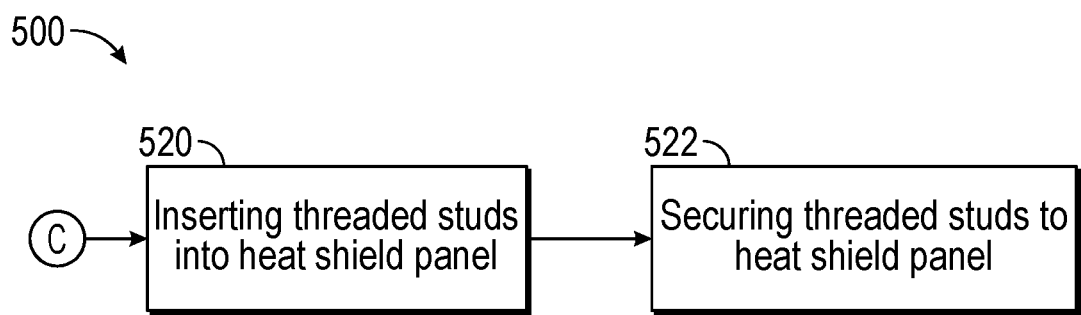
Figure 5K:
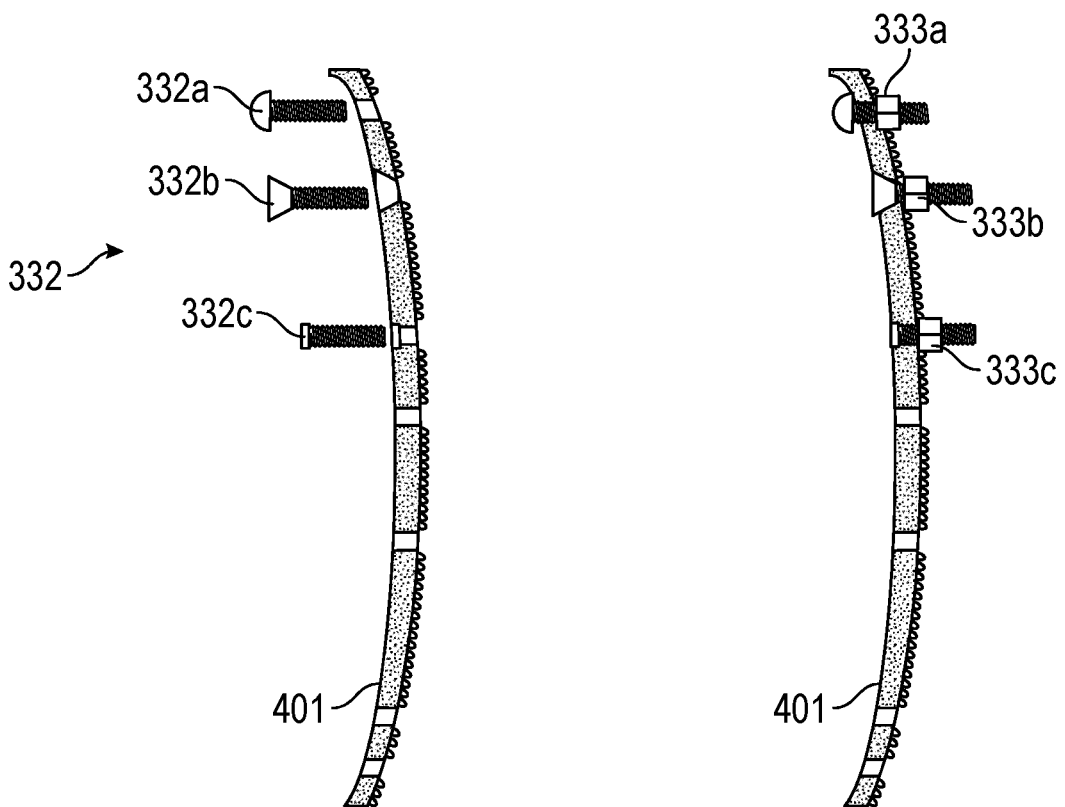

Referring now to FIGS. 5a-5k with continued reference to FIGS. 1-4. FIGS. 5a-5k is a flow chart illustrating a method 500 of manufacturing a heat shield panel assembly 400, according to an embodiment of the present disclosure. At block 502, melted wax 464 is injected into a tool possessing a negative cavity 466 of a heat shield panel 401, as seen in FIG. 5a. The negative cavity 466 may include multiple sections, such as, for example, a first section 466a and a second section 466b. The first section 466a may be a negative cavity of the first surface 410 and the second section 466b may be a negative cavity of the second surface 420. At block 504, the wax 464 is allowed to solidify to form a positive pattern of the heat shield panel 401, as seen in FIG. 5b. At block 506, the positive pattern 468 made from wax 464 is removed from the negative cavity 466, as seen in FIG. 5c. At block 508, the positive pattern 468 made from wax 464 is coated with a ceramic 470, as seen in FIG. 5d. At block 510, the positive pattern 468 made from wax 464 is melted away from the ceramic 470, thus leaving a cavity 472 formed in the ceramic 470. The cavity 472 forming a second negative cavity 474 of the heat shield panel 401. At block 512, melted metal 476 is introduced into the cavity 472 within the ceramic 470, as seen in FIG. 5f. At block 514, metal 476 within the cavity 472 is allowed to solidify to form the heat shield panel 401, as seen in FIG. 5g. At block 516, the ceramic 470 is removed from the heat shield panel 401 and what remains is the fully formed metallic heat shield panel 401. At block 518, threaded studs 332 are be formed. The threaded studs 332 may be formed by various methods, as discussed further below in relation to Methods 800, 900, and 1000. At block 520, the threaded studs 332 are inserted into the heat shield panel 401, as seen in FIG. 5j. As also seen in FIG. 5j, various types of threaded studs 332 may be used including but not limited to a rivet 332a, a screw 332b, or a bolt 332c. At block 522, each threaded stud 332 is secured to the heat shield panel 401. Depending on the type of threaded stud 332 utilized, the method of securing the threaded stud 332 may vary. In some examples, the threaded stud 332 may be via a nut 333c, a weld 333b, and/or part of a rivet 333a.

Referring now to FIGS. 6a-6i with continued reference to FIGS. 1-4. FIGS. 6a-6i is a flow chart illustrating a method 600 of manufacturing a heat shield assembly 400, according to an embodiment of the present disclosure.

At block 601, a fluid ceramic slurry is injected into a first metal setter 591 and a second metal setter 592, as seen in FIG. 6a. Each metal setter 591, 592 includes a positive pattern of half the heat shield panel 401. The first metal setter 591 may include positive pattern 591a of the first surface 410 and the second metal setter 592 may include a positive pattern 592a of the second surface 420. At block 602, the ceramic slurry 590 within each of the first metal setter 591 and the second metal setter 592 is hardened by either thermal means and/or chemical means. At block 603, the first metal setter 591 and second metal setter 592 are each removed from the hardened ceramic slurry 590 that is now the ceramic strong back core 578, which is composed of a first section 580a and a second section 580b. The first section 580a was formed from the first metal setter 591 and the second section 580b was formed from the second metal setter 592. When the first section 580a and the section 580b are aligned together a negative cavity 580 of a heat shield panel 401 is formed.

At block 604, melted metal 576 is introduced into the strong back core 578 containing the negative cavity 580 of the heat shield panel 401, as seen in FIG. 6d. The strong back core 578 may be composed of a ceramic media, such as for example $Y_2O_3$, $ZrO_2$, and $ZrAl_2O_4$. Advantageously, by using yttrium in the strong back core 578, yttrium may be prevented from migrating out of the metal 576 and into the strong back core 578. Increased yttrium levels in the metal 976 leads to lower oxidation that may weaken the heat shield panel 401. The negative cavity 580 may include multiple sections, such as, for example, a first section 580a and a second section 580b. The first section 580a may be a negative cavity of the first surface 410 and the second section 580b may be a negative cavity of the second surface 420. It is understood that while method 600 discusses forming a strong back core 578 for both the first section 580a and the second section 580b that only one of the first section 580a and the second section 580b may be formed from the strong back core 578. In one example the first section 580a may be a strong back core 578 formed from a ceramic media, such as, for example $Y_2O_3$, $ZrO_2$, and $ZrAl_2O_4$, whereas the second section 580b may be formed from a different material. At block 605, the metal 576 is allowed to solidify to form the heat shield panel 401, as seen in FIG. 6e. At block 606, the strong back core 578 is removed from the heat shield panel 401 and what remains is the fully formed metallic heat shield panel 401. At block 608, threaded studs 332 are formed. The threaded studs 332 may be formed by various methods, as discussed further below in relation to Methods 800, 900, and 1000. At block 610, the threaded studs 332 are inserted into the heat shield panel 401, as seen in FIG. 6h. As also seen in FIG. 6h, various types of threaded studs 332 may be used including but not limited to a rivet 332a, a screw 332b, or a bolt 332c. At block 612, each threaded stud 332 is secured to the heat shield panel 401. Depending on the type of threaded stud 332 utilized, the method of securing the threaded stud 332 may vary. In some examples, the threaded stud 332 may be via a nut 333c, a weld 333b, and/or part of a rivet 333a.

Referring now to FIGS. 7a-7g with continued reference to FIGS. 1-4. FIGS. 7a-7g is a flow chart illustrating a method 700 of manufacturing a heat shield panel 401, according to an embodiment of the present disclosure. A mold 750 containing a negative cavity 760 of a heat shield panel 401 may be seen in FIG. 7a. A block 704 the mold 750 is pre-heated to a first temperature by a heat source 780. The heat source 780 is configured to add heat 797 to the mold. At block 704, melted metal 776 is introduced into the mold 750. The first temperature of the mold 750 may be higher than a temperature required to melt the metal 776. Attached to the bottom 750b of the mold 750 is a helix grain selector 790. The helix grain selector may include a top 790a and a bottom 790b. The helix grain selector 790 is fluidly connected to the mold 750 and thus melted metals 776 injected into a top 750a of the mold 750 will flow through the mold 750 and into the helix grain selector 790. Thus, the helix grain selector 790 will be filled with melted metal 776 and then the mold 750 is filled with melted metal 776. Oriented below the helix grain selector 790 and in thermodynamic communication with the helix grain selector 790 is a cooling platform 782. The cooling platform 782 is adjustable and may lower the mold 750 from the heat source 780 into a cooling source 784. The cooling platform 782 and the cooling source 784 are both in thermodynamic communication with the mold 750 are configured to absorb heat 797 from the mold 750. At block 706, the melted metal 776 in the mold 750 is allowed to reach a selected equilibrium temperature and then the cooling platform 782 begins to cool the melted metal 776 within the helix grain selector 790 by absorbing heat, starting from a bottom 790b of the helix grain selector 790 to a top 790a of the helix grain selector 790. The cooling from the cooling platform 782 will cause the metal 750 within the helix grain selector 790 to crystallize beginning closest to the cooling platform 782 and moving up towards the mold 750. Helix guide wire 792 contained within the helix grain selector 790 will force the metal 776 to crystal in a crystal pattern such as, for example a single crystal. A multi-crystal pattern may also be utilized. The crystal pattern may be oriented such that desired material characteristics are achieved, such as, for example, utilizing a <001> crystal orientation to achieve high ductility or utilizing a <111> crystal orientation to achieve a high modulus.

At block 708, the mold 750 is lowered into the cooling source 784 at a selected rate as the metal 776 begins to crystallize further away from the cooling platform 782. The metal 776 will crystallize from the bottom 750b of the mold 750 to the top 750a of the mold 750. The mold 750 may continue to be lowered into the cooling source 784 until all of the metal 776 has crystallized and the heat shield panel 401 is fully formed. At block 710, the heat shield panel 401 is removed from the mold 750 and what remains is the fully formed metallic heat shield panel 401. The fully formed metallic heat shield panel 401 may also require additional finishing and inspection as necessary. At block 712, threaded studs 332 are formed. The threaded studs 332 may be formed by various methods, as discussed further below in relation to Methods 800, 900, and 1000. At block 714, the threaded studs 332 are inserted into the heat shield panel 401, as seen in FIG. 7f. As also seen in FIG. 7f, various types of threaded studs 332 may be used including but not limited to a rivet 332a, a screw 332b, or a bolt 332c. At block 716, each threaded stud 332 is secured to the heat shield panel 401. When installed in the gas turbine engine 20, the heat shield panel 401 is in communication with the combustion chamber 302. Depending on the type of threaded stud 332 utilized, the method of securing the threaded stud 332 may vary. In some examples, the threaded stud 332 may be via a nut 333c, a weld 333b, and/or part of a rivet 333a.

Figure 8G:
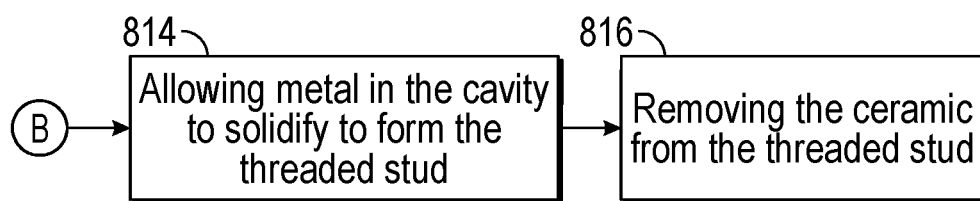
Figure 8H:
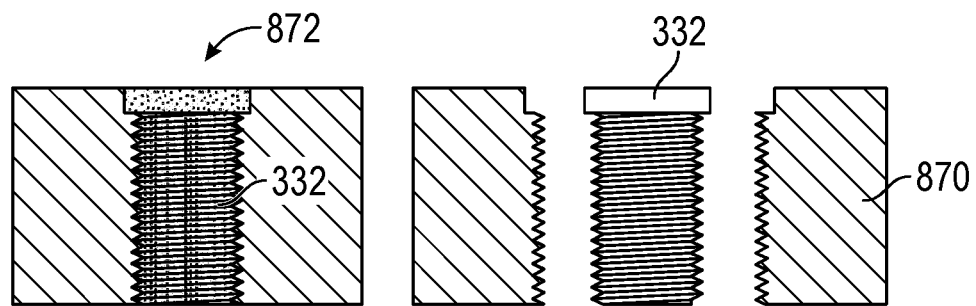

Referring now to FIGS. 8a-8h with continued reference to FIGS. 1-4. FIGS. 8a-8h is a flow chart illustrating a method 800 of manufacturing a threaded stud 332, according to an embodiment of the present disclosure. At block 802, melted wax 864 is injected into a negative cavity 866 of a threaded stud 332, as seen in FIG. 8a. The negative cavity 866 may include multiple sections, such as, for example, a first section 866a and a second section 866b. At block 804, the wax 864 is allowed to solidify to form a positive pattern 868 of the threaded stud 332, as seen in FIG. 8b. At block 806, the positive pattern 868 made from wax 864 is removed from the negative cavity 866, as seen in FIG. 8c. At block 808, the positive pattern 868 made from wax 864 is coated with a ceramic 870, as seen in FIG. 8d. At block 810, the positive pattern 868 made from wax 864 is melted away from the ceramic 870, thus leaving a cavity 872 formed in the ceramic 870. The cavity 872 forming a second negative cavity 874 of the threaded stud 332. At block 812, melted metal 876 is introduced into the cavity 872 within the ceramic 870, as seen in FIG. 8f. At block 814, metal 876 within the cavity 872 is allowed to solidify to form the threaded stud 332, as seen in FIG. 8g. At block 816, the ceramic 870 is removed from the threaded stud 332 and what remains is the fully formed threaded stud 332.

Referring now to FIGS. 9a-9c with continued reference to FIGS. 1-4. FIG. 9a-9c is a flow chart illustrating a method 900 of manufacturing a threaded stud 332, according to an embodiment of the present disclosure. At block 902, melted metal 976 is injected into strong back core 978 containing a negative cavity 980 of a threaded stud 332, as seen in FIG. 9a. The strong back core 978 may be composed of a media, such as for example $Y_2O_3$, $ZrO_2$, and $ZrAl_2O_4$. Advantageously, by using yttrium in the strong back core 978, yttrium may be prevented from migrating out of the metal 976 and into the strong back core 978. Increased yttrium levels in the metal 976 leads to lower oxidation that may weaken the threaded stud 332. At block 904, the metal 976 is allowed to solidify to form the threaded stud 332, as seen in FIG. 9b. At block 906, the strong back core 978 is removed from the threaded stud 332 and what remains is the fully formed threaded stud 332, as seen in FIG. 9c.

Referring now to FIGS. 10a-10d with continued reference to FIGS. 1-4. FIGS. 10a-10d is a flow chart illustrating a method 1000 of manufacturing a threaded stud 332, according to an embodiment of the present disclosure. A mold 1050 containing a negative cavity of a threaded stud 332 may be seen in FIG. 10a. At block 1004 the mold 1050 is pre-heated to a first temperature by a heat source 1080. The heat source 1080 is configured to add heat 1097 to the mold 1050. At block 1004, melted metal 1076 is introduced into the mold 1050. The first temperature of the mold 1050 may be higher than a temperature required to melt the metal 1076. Attached to the bottom 1050b of the mold 1050 is a helix grain selector 1090. Alternatively, in place of a helix grain selector 1090 a metal seed selector may be used. The helix grain selector may include a top 1090a and a bottom 1090b. The helix grain selector 1090 is fluidly connected to the mold 1050 and thus melted metals 1076 injected into atop 1050a of the mold 1050 will flow through the mold 1050 and into the helix grain selector 1090. Thus, the helix grain selector 1090 will be filled with melted metal 1076 and then the mold 1050 is filled with melted metal 1076. Oriented below the helix grain selector 1090 and in thermodynamic communication with the helix grain selector 1090 is a cooling platform 1082. The cooling platform 1082 is adjustable and may lower the mold 1050 from the heat source 1080 into a cooling source 1084. The cooling platform 1082 and the cooling source 1084 are both in thermodynamic communication with the mold 1050 are configured to absorb heat 1097 from the mold 1050. At block 1006, the melted metal 1076 in the mold 1050 is allowed to reach a selected equilibrium temperature and then the cooling platform 1082 begins to cool the melted metal 1076 within the helix grain selector 1090 by absorbing heat, starting from a bottom 1090b of the helix grain selector 1090 to a top 1090a of the helix grain selector 1090. The cooling from the cooling platform 1082 will cause the metal 1050 within the helix grain selector 1090 to crystallize beginning closest to the cooling platform 1082 and moving up towards the mold 1050. Helix guide wire 1092 contained within the helix grain selector 1090 will force the metal 1076 to crystal in a crystal pattern such as, for example a single crystal. A multi-crystal pattern may also be utilized. The crystal pattern may be oriented such that desired material characteristics are achieved, such as, for example, utilizing a <001> crystal orientation to achieve high ductility or utilizing a <111> crystal orientation to achieve a high modulus. Additionally, threads of the threaded studs may be grown separately in a single crystal pattern or a multi-crystal pattern. Similarly, the crystal pattern of the threads may be oriented such that desired material characteristics are achieved, such as, for example, utilizing a <001> crystal orientation to achieve high ductility or utilizing a <111> crystal orientation to achieve a high modulus.

At block 1008, the mold 1050 is lowered into the cooling source 1084 at a selected rate as the metal 1076 begins to crystallize further away from the cooling platform 1082. The metal 1076 will crystallize from the bottom 1050b of the mold 1050 to the top 1050a of the mold 1050. The mold 1050 may continue to be lowered into the cooling source 1084 until all of the metal 1076 has crystallized and the threaded stud 332 is fully formed. At block 1010, the threaded stud 332 is removed from the mold 1050 and what remains is the fully formed metallic threaded stud 332.

While the above description has described the flow process of FIGS. 5-10 in a particular order, it should be appreciated that unless otherwise specifically required in the attached claims that the ordering of the steps may be varied.

Technical effects of embodiments of the present disclosure include manufacturing a heat shield panel and threaded studs separately and then assembling the heat shield panel and threaded studs together.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of manufacturing a heat shield panel assembly, the method comprising:
    injecting melted wax into a negative cavity of a heat shield panel, the heat shield panel comprising one or more orifices;
    allowing the wax to solidify to form a positive pattern of the heat shield panel;
    removing the positive pattern from the negative cavity;
    coating the positive pattern with a ceramic;
    melting the positive pattern away from the ceramic, the ceramic having a cavity forming a second negative cavity of the heat shield panel;
    pouring melted metal into the cavity;
    allowing metal in the cavity to solidify to form the heat shield panel;
    removing the ceramic from the heat shield panel; and
    forming each of one or more threaded studs in a separate process from forming the heat shield panel, each of the one or more threaded studs being composed of a stud portion and a thread portion, wherein the stud portion and the thread portion are simultaneously formed.

2. The method of claim 1, further comprising:
    inserting each of the one or more threaded studs into each of the one or more orifices.

3. The method of claim 2, further comprising:
    securing each of the one or more threaded studs to the heat shield panel.

4. The method of claim 1, wherein the forming further comprises:
    injecting melted wax into a negative cavity of a threaded stud;
    allowing the wax to solidify to form a positive pattern of the threaded stud;
    removing the positive pattern of the threaded stud from the negative cavity of the threaded stud;
    coating the positive pattern of the threaded stud with a ceramic;
    melting the positive pattern of the threaded stud away from the ceramic, the ceramic having a second cavity forming a second negative cavity of the threaded stud;
    pouring melted metal into the second cavity;
    allowing metal in the second cavity to solidify to form the threaded stud; and
    removing the ceramic from the threaded stud.

5. The method of claim 1, wherein the forming further comprises:
    injecting melted metal into a negative cavity of a threaded stud in a strong back core containing at least one of $Y_2O_3$, $ZrO_2$, and $ZrAl_2O_4$, wherein the metal comprises yttrium;
    allowing the metal to solidify to form the threaded stud; and
    removing the threaded stud from the strong back core.

6. The method of claim 1, wherein the forming further comprises:
    heating a mold containing a negative cavity of a threaded stud to a first temperature, wherein the negative cavity is fluidly connected to a helix grain selector located below the mold and on top of a cooling platform thermally connected to the helix grain selector;
    introducing melted metal into the negative cavity of the threaded stud and the helix grain selector;
    allowing metal in the negative cavity of the threaded stud and the helix grain selector to reach a selected equilibrium temperature;
    cooling metal within the helix grain selector using the cooling platform starting from the cooling platform and moving towards the mold;
    slowly lowering the mold into a cooling source to allow solidification of metal within the negative cavity of the threaded stud from a bottom of the mold to the top of the mold to form the threaded stud; and
    removing the threaded stud from the mold.

7. A method of manufacturing a heat shield panel assembly, the method comprising:
    injecting melted metal into a negative cavity of a heat shield panel in a strong back core containing at least one of $Y_2O_3$, $ZrO_2$, and $ZrAl_2O_4$, wherein the metal comprises yttrium, and wherein the heat shield panel comprising one or more orifices;
    allowing the metal to solidify to form the heat shield panel;
    removing the heat shield panel from the strong back core; and
    forming each of one or more threaded studs in a separate process from forming the heat shield panel, each of the one or more threaded studs being composed of a stud portion and a thread portion, wherein the stud portion and the thread portion are simultaneously formed.

8. The method of claim 7, further comprising:
    inserting each of the one or more threaded studs into each of the one or more orifices.

9. The method of claim 8, further comprising:
    securing each of the one or more threaded studs to the heat shield panel.

10. The method of claim 7, wherein the forming further comprises:
    injecting melted wax into a negative cavity of a threaded stud;
    allowing the wax to solidify to form a positive pattern of the threaded stud;
    removing the positive pattern of the threaded stud from the negative cavity of the threaded stud;
    coating the positive pattern of the threaded stud with a ceramic;
    melting the positive pattern of the threaded stud away from the ceramic, the ceramic having a second cavity forming a second negative cavity of the threaded stud;
    pouring melted metal into the second cavity;
    allowing metal in the second cavity to solidify to form the threaded stud; and
    removing the ceramic from the threaded stud.

11. The method of claim 7, wherein the forming further comprises:
  injecting melted metal into a negative cavity of a threaded stud in a second strong back core containing at least one of $Y_2O_3$, $ZrO_2$, and $ZrAl_2O_4$, wherein the metal comprises yttrium;
  allowing the metal to solidify to form the threaded stud; and
  removing the threaded stud from the second strong back core.

12. The method of claim 7, wherein the forming further comprises:
  heating a mold containing a negative cavity of a threaded stud to a first temperature, wherein the negative cavity is fluidly connected to a helix grain selector located below the mold and on top of a cooling platform thermally connected to the helix grain selector;
  introducing melted metal into the negative cavity of the threaded stud and the helix grain selector;
  allowing metal in the negative cavity of the threaded stud and the helix grain selector to reach a selected equilibrium temperature;
  cooling metal within the helix grain selector using the cooling platform starting from the cooling platform and moving towards the mold;
  slowly lowering the mold into a cooling source to allow solidification of metal within the negative cavity of the threaded stud from a bottom of the mold to the top of the mold to form the threaded stud; and
  removing the threaded stud from the mold.

13. A method of manufacturing a heat shield panel assembly, the method comprising:
  heating a mold containing a negative cavity of a heat shield panel to a first temperature, wherein the negative cavity is fluidly connected to a helix grain selector located below the mold and on top of a cooling platform thermally connected to the helix grain selector, wherein the heat shield panel comprises one or more orifices;
  introducing melted metal into the negative cavity of the heat shield panel and the helix grain selector;
  allowing metal in the negative cavity of the heat shield panel and the helix grain selector to reach a selected equilibrium temperature;
  cooling metal within the helix grain selector using the cooling platform starting from the cooling platform and moving towards the mold;
  slowly lowering the mold into a cooling source to allow solidification of metal within the negative cavity of the heat shield panel from a bottom of the mold to the top of the mold to form the heat shield panel;
  removing the heat shield panel from the mold; and
  forming each of one or more threaded studs in a separate process from forming the heat shield panel, each of the one or more threaded studs being composed of a stud portion and a thread portion, wherein the stud portion and the thread portion are simultaneously formed.

14. The method of claim 13, further comprising:
  inserting each of the one or more threaded studs into each of the one or more orifices.

15. The method of claim 13, further comprising:
  securing each of the one or more threaded studs to the heat shield panel.

16. The method of claim 13, wherein the forming further comprises:
  injecting melted wax into a negative cavity of a threaded stud;
  allowing the wax to solidify to form a positive pattern of the threaded stud;
  removing the positive pattern of the threaded stud from the negative cavity of the threaded stud;
  coating the positive pattern of the threaded stud with a ceramic;
  melting the positive pattern of the threaded stud away from the ceramic, the ceramic having a second cavity forming a second negative cavity of the threaded stud;
  pouring melted metal into the second cavity;
  allowing metal in the second cavity to solidify to form the threaded stud; and
  removing the ceramic from the threaded stud.

17. The method of claim 13, wherein the forming further comprises:
  injecting melted metal into a negative cavity of a threaded stud in a strong back core containing at least one of $Y_2O_3$, $ZrO_2$, and $ZrAl_2O_4$, wherein the metal comprises yttrium;
  allowing the metal to solidify to form the threaded stud; and
  removing the threaded stud from the strong back core.

18. The method of claim 13, wherein the forming further comprises:
  heating a second mold containing a negative cavity of a threaded stud to a first temperature, wherein the negative cavity is fluidly connected to a second helix grain selector located below the second mold and on top of a cooling platform thermally connected to the second helix grain selector;
  introducing melted metal into the negative cavity of the threaded stud and the second helix grain selector;
  allowing metal in the negative cavity of the threaded stud and the second helix grain selector to reach a selected equilibrium temperature;
  cooling metal within the second helix grain selector using the cooling platform starting from the cooling platform and moving towards the second mold;
  slowly lowering the second mold into a cooling source to allow solidification of metal within the negative cavity of the threaded stud from a bottom of the second mold to the top of the second mold to form the threaded stud; and
  removing the threaded stud from the second mold.

* * * * *